(12) United States Patent
Harrison et al.

(10) Patent No.: US 11,797,866 B2
(45) Date of Patent: Oct. 24, 2023

(54) SYSTEMS AND METHODS FOR ACCELERATING EXECUTION OF PROCESSES BASED ON ARTIFICIAL INTELLIGENCE (AI) PREDICTION OF BLOCKCHAIN CONSENSUS

(71) Applicant: salesforce.com, inc., San Francisco, CA (US)

(72) Inventors: Daniel Thomas Harrison, Newmarket (CA); Michael Salem, Dallas, TX (US)

(73) Assignee: salesforce.com, inc.

( * ) Notice: Subject to any disclaimer, the term of this patent is extended or adjusted under 35 U.S.C. 154(b) by 1250 days.

(21) Appl. No.: 16/039,223

(22) Filed: Jul. 18, 2018

(65) Prior Publication Data

US 2020/0027005 A1 Jan. 23, 2020

(51) Int. Cl.
| | |
|---|---|
| G06N 5/02 | (2023.01) |
| H04L 41/16 | (2022.01) |
| G06N 7/01 | (2023.01) |
| H04L 67/141 | (2022.01) |
| H04L 67/53 | (2022.01) |

(52) U.S. Cl.
CPC .............. *G06N 5/02* (2013.01); *G06N 7/01* (2023.01); *H04L 41/16* (2013.01); *H04L 67/141* (2013.01); *H04L 67/53* (2022.05)

(58) Field of Classification Search
CPC ............................ H04L 2209/38; G06N 20/00
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

OTHER PUBLICATIONS

Lashkari, et al, "A Comprehensive Review of Blockchain Consensus Mechanisms," Mar. 2021, IEEE, https://ieeexplore.ieee.org/document/9376868 (Year: 2001).*

(Continued)

*Primary Examiner* — William G Trost, IV
*Assistant Examiner* — Christopher P Cadorna
(74) *Attorney, Agent, or Firm* — Lorenz & Kopf, LLP

(57) ABSTRACT

A method for using a distributed ledger (DL) of a blockchain applicable to a network of blockchain nodes is provided. The method reduces a time period between an assertion placed on the blockchain by an assertor blockchain node and execution of one or more action items dependent on a consensus of the assertion, by: creating an Artificial Intelligence (AI) model, by one of the blockchain nodes of the network, using historical data stored by the DL, wherein the network of blockchain nodes further comprises the assertor blockchain node; calculating an index value indicating a probability that the consensus is true, based on the AI model and the historical data stored by the DL, by the one of the blockchain nodes, wherein each of the blockchain nodes comprises a computer system including at least a processor, a system memory element, and a communication device configured to send and receive data transmissions between the blockchain nodes of the network; and when the index value exceeds a predefined threshold, initiating the execution of the one or more action items dependent on the consensus, by the one of the blockchain nodes.

20 Claims, 9 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,781,990 B1 * | 7/2014 | de Alfaro .............. G06F 16/337 706/52 |
| 8,862,492 B1 * | 10/2014 | Kulshreshtha ......... G06Q 50/01 705/7.32 |
| 10,909,510 B1 * | 2/2021 | Kurani ................ G06Q 20/065 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0239405 A1 * | 10/2007 | Behrens ................ G09B 5/00 703/2 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |

(56) References Cited

U.S. PATENT DOCUMENTS

2013/0218949 A1    8/2013  Jakobson
2013/0218966 A1    8/2013  Jakobson
2013/0247216 A1    9/2013  Cinarkaya et al.

OTHER PUBLICATIONS

Oyinloye, et al. "Blockchain Consensus: An Overview of Alternative Protocols," Jun. 2021, MDPI, https://www.mdpi.com/2073-8994/13/8/1363 (Year: 2021).*

Sliwinski, et al. "ABC: Proof-of-Stake without Consensus," Sep. 2019, Cornell University, https://arxiv.org/abs/1909.10926 (Year: 2019).*

Sgantzos, et. al, "Artificial Intelligence Implementations on the Blockchain. Use Cases and Future Applications," Jun. 2019, https://www.mdpi.com/1999-5903/11/8/170 (Year: 2019).*

\* cited by examiner

SYSTEMS AND METHODS FOR ACCELERATING EXECUTION OF PROCESSES BASED ON ARTIFICIAL INTELLIGENCE (AI) PREDICTION OF BLOCKCHAIN CONSENSUS

TECHNICAL FIELD

Embodiments of the subject matter described herein relate generally to determining a likelihood of reaching consensus on a blockchain network. More particularly, embodiments of the subject matter relate to the automatic execution of processes based on an acceptable level of confidence that consensus will be reached for an assertion placed on a distributed ledger of a blockchain.

BACKGROUND

Today, industries with interdependent participants require a web of checks and balances that span countries, languages, currencies, and various human intervention (such as manual inspections and testing). The speed at which business can operate is governed by the speed at which these checks and balances can be completed. Problems with current methods and the speed of global, interdependent, industrial cooperation, include reliance on trust between parties who inherently may not trust one another for reasons related to commercial competition, contrasting priority, differing values, bias, or the like. For example, if a manufacturer in Country A ships goods to an importer in Country B, a simple counting error between the manufacturer and importer could result in a lack of trust between the two parties even if the act was not malicious. To combat this problem, various governments, regulatory bodies, and other companies, have taken it upon themselves to be the trusted agents facilitating the record keeping and confirmation of global transactions. However, the human intervention and silo'ed bodies of trust (within silo'ed IT systems) are still open to the same issues, such as potential negligence, fraud, or slow confirmation times as the described example of the manufacturer and the supplier. Such a process may be created with good intentions, only to become a global entanglement of misunderstandings.

Business transactions require trust to execute successfully, and the emergence of Distributed Ledgers ("DL") running Smart Contracts validated on a Blockchain ("BC") have enabled the democratization of the trust process by giving a global, single view of the world that all parties can independently verify, yet no parties can independently manipulate (based on the technical foundation of blockchain's architecture—specifically its append-only immutability). Before DLs, data was created as copies of the truth and was passed from person to person. Maintaining multiple copies of any file increases the potential for information mismatch. With DLs, that same data is instead held in an objective, globally accessible third party ledger that is stored, replicated, and updated, across every node in the network. This reduces the multiple communications, copies, and transmissions into a single, master record of the truth that all parties can point to and affirm or deny. Affirmation from all parties is referred to as "consensus".

Even though DLs are an order of magnitude more efficient at managing trust in distributed environment than traditional systems that include standard review and validation mechanisms, a DL can only operate as quickly as the speed at which consensus is gained. Accordingly, it is desirable to provide improvements to the operation of a standard blockchain network. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for using a distributed ledger (DL) of a blockchain applicable to a network of blockchain nodes. The method reduces a time period between an assertion placed on the blockchain by an assertor blockchain node and execution of one or more action items dependent on a consensus of the assertion, by: creating an Artificial Intelligence (AI) model, by one of the blockchain nodes of the network, using historical data stored by the DL, wherein the network of blockchain nodes further comprises the assertor blockchain node; calculating an index value indicating a probability that the consensus is true, based on the AI model and the historical data stored by the DL, by the one of the blockchain nodes, wherein each of the blockchain nodes comprises a computer system including at least a processor, a system memory element, and a communication device configured to send and receive data transmissions between the blockchain nodes of the network; and when the index value exceeds a predefined threshold, initiating the execution of the one or more action items dependent on the consensus, by the one of the blockchain nodes.

Some embodiments of the present disclosure provide a computer system communicatively coupled to a distributed ledger (DL) of a blockchain applicable to a network of blockchain nodes. The computer system includes: a system memory element, configured to store at least an artificial intelligence (AI) model based on historical data stored on the blockchain; a communication device, configured to send and receive data transmissions between the blockchain nodes of the network; and at least one processor, communicatively coupled to the system memory element and the communication device. The at least one processor is configured to: reduce a time period between an assertion placed on the blockchain by an assertor blockchain node and execution of one or more action items dependent on a consensus of the assertion, by: creating the Artificial Intelligence (AI) model, using the historical data stored by the DL, wherein the network of blockchain nodes further comprises the assertor blockchain node; calculating an index value indicating a probability that the consensus is true, based on the AI model and the historical data stored by the DL, wherein each of the blockchain nodes comprises a node computer system including at least a node processor, a node system memory element, and a node communication device configured to send and receive data transmissions between the blockchain nodes of the network; and when the index value exceeds a predefined threshold, initiating the execution of the one or more action items dependent on the consensus.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
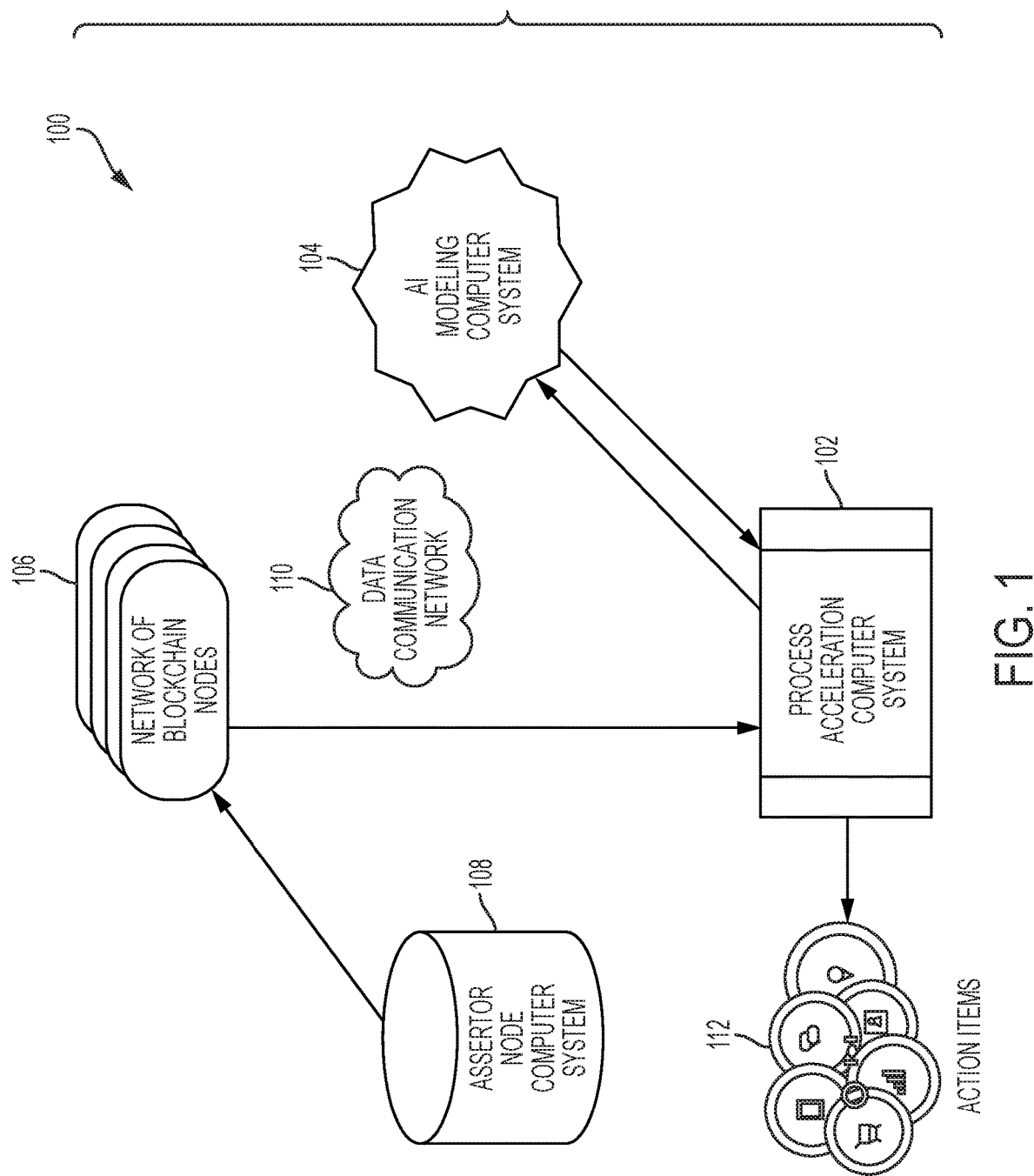
FIG. 1 is a diagram of a system for accelerating processes for an organization associated with a blockchain node, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for accelerating consensus-triggered processes, tasks, or action items for an entity making an assertion to a distributed ledger (DL) of a blockchain, prior to reaching consensus for the assertion. More specifically, the subject matter relates to the early execution of action items corresponding to an assertion placed on the blockchain, based on a determination that consensus for the assertion will eventually be reached. Contemplated herein are techniques for creating and using an artificial intelligence (AI) model and historical blockchain data to compute and index value indicating a probability that consensus will occur for the assertion, at some future point in time.

Certain terminologies are used with regard to the various embodiments of the present disclosure. A blockchain is a decentralized, shared, and continuously reconciled set of data. For purposes of the present disclosure, the blockchain uses a distributed ledger (DL), which is a database that is shared and synchronized across a network of blockchain nodes. The distributed ledger (DL) of the blockchain is implemented using a network of blockchain nodes. Each node is a computer system or computing device connected to the blockchain network. Each node may be disparately located, and the network of blockchain nodes operates on a peer-to-peer basis. Blockchain nodes retain identical copies of the DL, and can access DL records shared within the network. DL record are continuously reconciled, as any updates or additions made to the DL are copied to each of the network of blockchain nodes. Thus, DL transactions are visible to each of the blockchain nodes.

An assertion is a record of a statement that an action has been performed at a past point in time, is currently being performed at the present time, or will be performed at a future time. An assertion is generally placed on a distributed ledger of a blockchain by an entity (e.g., person, organization, business) associated with an assertor blockchain node. Any blockchain node of the network of blockchain nodes may be an "assertor" blockchain node. When referring to a particular assertion, the assertor blockchain node is the node that has placed the particular assertion on the distributed ledger of the blockchain. Consensus is an agreement between a predefined, minimum quantity of nodes of the blockchain network, that the assertion is valid. Agreement includes affirmative assent that the assertion is valid, by each individual one of the minimum quantity of nodes. Time is required for agreement to be reached. Each individual node provides assent according to its own choice and timeline. Thus, consensus (i.e., agreement between the minimum number of the blockchain nodes) may or may not be reached, and if reached, may require any period of time.

Turning now to the figures, FIG. 1 is a diagram of a system 100 for accelerating processes for an entity associated with a blockchain node, in accordance with the disclosed embodiments. It should be appreciated that FIG. 1 depicts a simplified embodiment of the system 100 for accelerating processes, and that some implementations of the system 100 may include additional elements or components.

A blockchain is a decentralized, shared, and continuously reconciled set of data. For purposes of the present disclosure, the blockchain uses a distributed ledger (DL), which is a database that is shared and synchronized across a network of blockchain nodes 106, which may be disparately located throughout various locations. By distributing and storing data across the network of blockchain nodes 106, the blockchain eliminates risks associated with centrally stored data and centralized points of vulnerability. Moreover, by storing blocks of information that are identical across the network of blockchain nodes 106, the blockchain cannot be controlled by any single entity, and has no single point of failure.

The distributed ledger (DL) of the blockchain is implemented using the network of blockchain nodes 106. Each of the network of blockchain nodes 106 is a computer system or computing device connected to the blockchain network using a client application that performs the task of validating and relaying blockchain transactions. Each of the network of blockchain nodes 106 retains an identical copy of the DL, and can access DL records shared within the network. Any changes or additions made to the DL are copied to each of the network of blockchain nodes 106, thus providing a continuous reconciliation of DL records. The network of blockchain nodes 106 operates on a peer-to-peer basis, and DL transactions are visible to each of the network of blockchain nodes 106.

Each computer system shown in FIG. 1 (e.g., the process acceleration computer system 102, the AI modeling computer system 104, the assertor node computer system 108, and each of the network of blockchain nodes 106) can be implemented using any computer or processor-based computing device that includes at least one processor, some form of memory hardware, and communication hardware to transmit and receive data transmissions.

For purposes of performing general blockchain operations and using the distributed ledger, the process acceleration computer system 102 and the assertor node computer system 108 communicate with the network of blockchain nodes 106 via wired and/or wireless communication connections, such as a data communication network 110. For purposes of performing analysis and accelerating processes associated with a particular assertion (as described herein), the process acceleration computer system 102 also communicates with the artificial intelligence (AI) modeling computer system 104 via wired and/or wireless communication connections, such as the data communication network 110.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

As shown, the network of blockchain nodes 106 includes a process acceleration computer system 102 and an assertor node computer system 108. In some embodiments, the process acceleration computer system 102 and the assertor node computer system 108 are implemented as a single, integrated computer system. However, in other embodiments, the process acceleration computer system 102 and the assertor node computer system 108 are implemented as separate and distinct computer systems.

The assertor node computer system 108 functions to place an assertion on the blockchain by updating an internally stored copy of the distributed ledger (DL). An assertion is a record of a statement that an action has been performed at a past point in time, is currently being performed at the present time, or will be performed at a future time. An assertion is generally placed on a distributed ledger of a blockchain by an entity (e.g., person, organization, business) associated with an assertor blockchain node (i.e., the assertor node computer system 108). Any blockchain node of the network of blockchain nodes may be an "assertor" blockchain node. When referring to a particular assertion, the assertor blockchain node is the node that has placed the particular assertion on the distributed ledger of the blockchain. The updates (i.e., the assertion) to the internally stored DL copy of the assertor node computer system 108, are propagated throughout the network of blockchain nodes 106. Thus, the assertion is placed on the blockchain that is stored by, and accessible to, each of the network of blockchain nodes 106.

The process acceleration computer system 102 functions to increase efficiency and timeliness of action items 112 associated with the assertion, by reducing or eliminating a time delay that exists between placement of the assertion on the blockchain (by the assertor node computer system 108) and initiating execution of one or more action items that are normally triggered by reaching consensus for the assertion (by the network of blockchain nodes 106). To accomplish this, the process acceleration computer system 102 functions cooperatively with an artificial intelligence (AI) modeling computer system 104.

The AI modeling computer system 104 functions to create and update an AI model for the blockchain (or any applicable subset of the blockchain), using historical data stored by the blockchain. As described herein, the process acceleration computer system 102 transmits historical and current blockchain data to the AI modeling computer system 104, and initiates the creation and/or updating of an AI model for the blockchain (e.g., data stored by the distributed ledger (DL)), via the AI modeling computer system 104. The AI model is used to identify potential outcomes for assertions placed on the blockchain, by computing probabilities and formulating predictions based on the current configuration of the blockchain. More specifically, the AI model is used (by the process acceleration computer system 102) to determine a likelihood that consensus will be reached (by the network of blockchain nodes 106) for an assertion placed on the blockchain by the assertor node computer system 108. Consensus is an agreement between a predefined, minimum quantity of nodes of the network of blockchain nodes 106, that the assertion is valid. For these purposes, the AI modeling computer system 104 uses AI modeling techniques and algorithms that are well-known and commonly used in the industry. For example, implementations of the AI modeling computer system 104 may use, without limitation, Decision Tree Learning, Linear Regression, Logistic Regression, Random Forest, Naive Bayes, or the like.

As shown, the system 100 operates to accelerate the initiation or execution of processes (e.g., action items or tasks) dependent on probability of consensus of an assertion placed on the blockchain. Such action items 112 are designated for completion by an entity associated with the assertion and the assertor node computer system 108, when the probability of consensus for the assertion is expected to be reached by the network of blockchain nodes 106 with a suitably high level of confidence. Each of the network of blockchain nodes 106 is associated with a participant or an entity that is using the blockchain functionality via one of the nodes in the network of blockchain nodes 106. An entity or blockchain participant may be a person, a business, or other type of organization, and the entity uses the assertor node computer system 108 to place an assertion on the blockchain. An assertion is associated with one or more corresponding action items 112 appropriate for completion when the assertion is deemed valid. Action items 112 may include any organizational task, notification or alert, business process, or computer-executable program which is normally initiated when consensus is reached for the assertion. However, as described herein, the execution of action items 112 may be initiated when consensus for the assertion is deemed likely, by the AI modeling computer system 104, but before consensus is actually achieved.

To this end, during typical operation, the process acceleration computer system 102 functions to: (i) recognize that an assertion has been placed on the blockchain (by the assertor node computer system 108), (ii) initiate the creation and updating of an AI model (by the AI modeling computer system 104), and (iii) use the AI model to compute an index value indicating a probability that consensus will be reached (by the network of blockchain nodes 106) for the assertion. When the index value indicates that consensus for the assertion will eventually be reached, at any future point in time, then the process acceleration computer system 102 initiates execution of one or more action items 112 that correspond to the assertion. As a result, the "trigger" for completing the corresponding action items 112 is the computed index value, thereby initiating the action items 112 earlier than reaching consensus for the assertion. When completion of the action items is triggered by consensus, there is a time delay between placement of the assertion on the blockchain and completion of the action items 112. However, as described herein, completion of the action items 112 is triggered by a computed index value indicating that consensus will likely occur, which reduces or eliminates the typical time delay that exists between placement of the assertion on the blockchain and completion of the action items 112.

Figure 2:
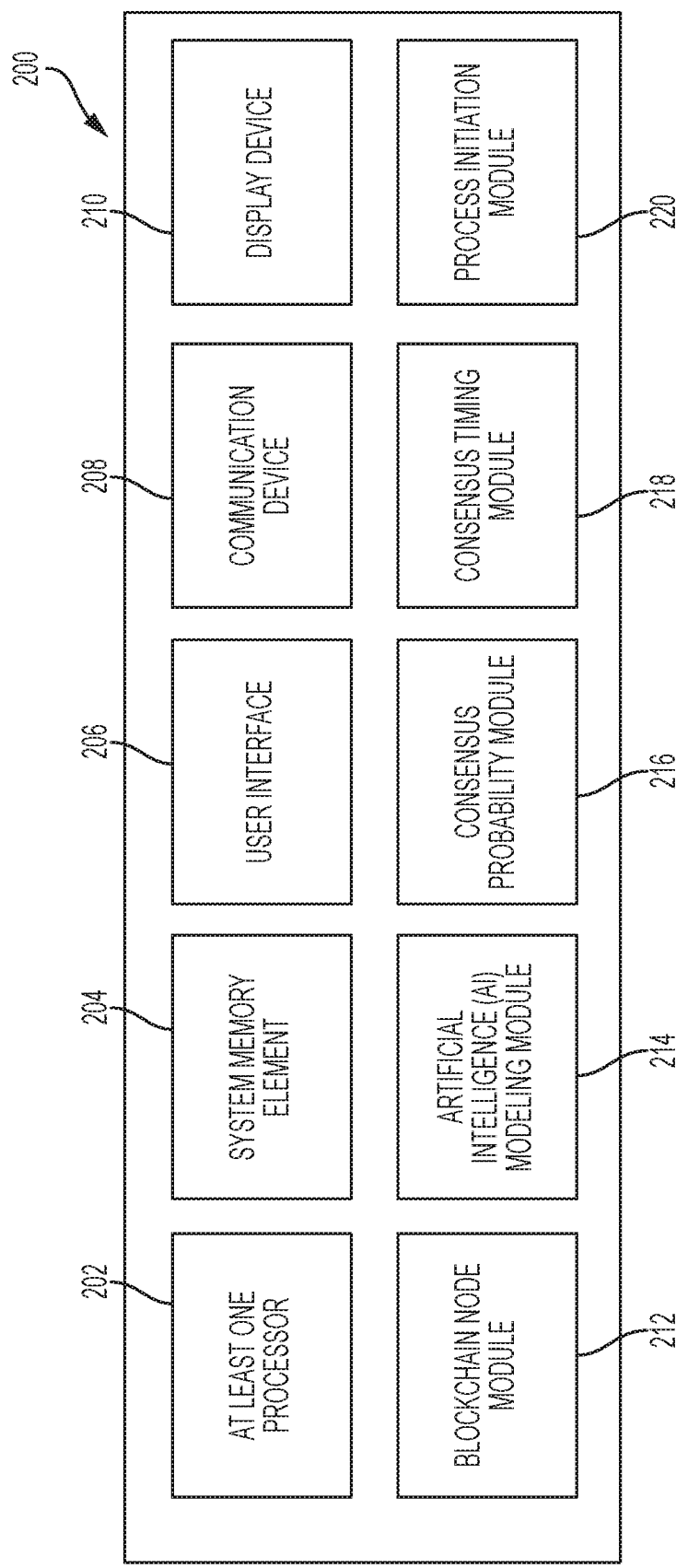
FIG. 2 is a functional block diagram of a process acceleration computer system, in accordance with the disclosed embodiments.

FIG. 2 is a functional block diagram of a process acceleration computer system 200, in accordance with the disclosed embodiments. It should be noted that the process acceleration computer system 200 can be implemented with the process acceleration computer system 102 depicted in FIG. 1. In this regard, the process acceleration computer system 200 shows certain elements and components of the process acceleration computer system 102 in more detail. The process acceleration computer system 200 generally includes, stores, maintains, operates, and/or executes, without limitation: at least one processor 202; a system memory 204 element; a user interface 206; a communication device 208; a display device 210; a blockchain node module 212; an artificial intelligence (AI) modeling module 214; a consensus probability module 216; a consensus timing module 218; and a process initiation module 220. These elements and features of the process acceleration computer system 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the process acceleration computer system 200 will include other elements, modules, and features that cooperate to support the desired functionality. For simplicity, FIG. 2 only depicts certain elements that relate to the techniques described in more detail below.

The process acceleration computer system 200 includes at least one processor 202. The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to, and communicates with, the system memory 204 element. The system memory 204 element is configured to store any obtained or generated data associated with a distributed ledger (DL), blockchain functionality, computational capabilities associated with an index value indicating a probability of achieving consensus for a particular assertion, and the initiation of action items, tasks, or processes associated with an assertion. The system memory 204 may be realized using any number of devices, components, or modules, as appropriate to the embodiment. Moreover, the process acceleration computer system 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of process acceleration computer system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the process acceleration computer system 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the process acceleration computer system 200. For example, in certain embodiments where the process acceleration computer system 200 also performs functionality of an assertor node computer system, the user interface 206 could be manipulated by an operator to place an assertion on the blockchain. As another example, the user interface 206 could be manipulated by an operator to request computation of an index value for a particular assertion placed on the blockchain. As a third example, the user interface 206 could be manipulated by an operator to initiate the execution of computer-executable action items, in response to a received notification that a computed index value meets or exceeds the predefined threshold, as described herein.

In certain embodiments, the user interface 206 may include or cooperate with various features to allow a user to interact with the process acceleration computer system 200 via graphical elements rendered on a display element. Accordingly, the user interface 206 may initiate the creation, maintenance, and presentation of a graphical user interface (GUI). In certain embodiments, the display device 210 implements touch-sensitive technology for purposes of interacting with the GUI. Thus, a user can manipulate the GUI by moving a cursor symbol rendered on the display device 210, or by physically interacting with the display device 210 itself for recognition and interpretation, via the user interface 206.

The communication device 208 is suitably configured to communicate data between the process acceleration computer system 200 and one or more computer systems (e.g., AI modeling computer system 104, assertor node computer system 108, and any of the network of blockchain nodes 106 of FIG. 1). The communication device 208 may transmit and receive communications over a wireless local area network (WLAN), the Internet, a satellite uplink/downlink, a cellular network, a broadband network, a wide area network, and/or any other applicable computer-based communication technology, as described previously with regard to reference 110 of FIG. 1. As described in more detail below, data received by the communication device 208 may include, without limitation: blockchain data (e.g., historical blockchain data, updates to the blockchain data), artificial intelligence (AI) modeling data, assertion data (e.g., assertor identity, assertion timing, action items associated with an assertion), and other data compatible with the process acceleration computer system 200. Data provided by the communication device 208 may include, without limitation: blockchain data; third party data used to augment an AI model for the blockchain; a computed index value indicating a probability that consensus will be reached for an assertion; notifications or alerts to execute action items, for presentation to a user or entity associated with an assertion; commands to execute computer-based processes (e.g., action items) associated with an assertion; and the like.

The display device 210 is configured to display various icons, text, and/or graphical elements associated with blockchain data; assertions placed on the blockchain; computed index values indicating probability of achieving consensus for the assertion; action items corresponding to an assertion; alerts and notifications indicating a status of an assertion, index value, consensus, or action item; or the like. The display device 210 is communicatively coupled to the user interface 206 and the at least one processor 202. In some embodiments of the process acceleration computer system 200, the at least one processor 202, the user interface 206, and the display device 210 are cooperatively configured to receive user input (e.g., via a touchscreen interface), and to display, render, or otherwise convey one or more graphical representations or images associated with accelerating processes or action items associated with an assertion placed on the blockchain, via the display device 210, as described in greater detail below. Various embodiments of the display device 210 include computer-based displays, including but not limited to, one or more: computer monitors; electronic displays; display screens of standalone, personal computing devices (e.g., laptop computer, tablet computer); touchscreen interfaces; or the like. It will be appreciated that although the display device 210 may be implemented using a single display, certain embodiments may use additional displays (i.e., a plurality of displays) to accomplish the functionality of the display device 210 described herein.

The blockchain node module 212 is configured to perform blockchain-related functionality of the process acceleration computer system 200. The process acceleration computer system 200 is one of a network of blockchain nodes (see reference 106, FIG. 1) and, as such, communicates with other nodes of the blockchain network to transmit and receive blockchain data. The blockchain node module 212 manages the locally stored and maintained copy of the distributed ledger (DL) of the blockchain, and revises the DL when updates, changes, or new assertions are made to the blockchain by one of the other nodes of the blockchain network. In the context of the present disclosure, the term 'assertion' refers to an update, provided by a node to the distributed ledger, to be evaluated by other nodes of the blockchain network. When the required level of agreement is reached (e.g., agreement of 51%) by the evaluating nodes, consensus is achieved, and the transaction is appropriately referred to as a 'transaction,' such that the change is not committed to the distributed ledger. Additionally, the blockchain node module 212 provides historical blockchain data, and current or updated blockchain data for purposes of AI modeling (by the AI modeling module 214).

The artificial intelligence (AI) modeling module 214 is configured to generate and use an AI model to identify potential outcomes for assertions placed on the blockchain, by computing probabilities and formulating predictions based on the current configuration of the blockchain. The AI modeling module 214 is configured to use AI modeling techniques and algorithms that are well-known and commonly used in the industry, such as: Decision Tree Learning, Linear Regression, Logistic Regression, Random Forest, Naïve Bayes, or the like.

The AI modeling module 214 creates, updates, and augments an AI model for the blockchain, including modeling the network of blockchain nodes or any subset of the network of blockchain nodes. The AI modeling module 214 creates the AI model using data stored by the blockchain (i.e., historical blockchain data, data stored by the distributed ledger (DL)). The created AI model may be updated (by the AI modeling module 214) according to a timed interval schedule or when triggered by an event (e.g., when an assertion is placed on the blockchain). In some embodiments, the AI modeling module 214 augments the AI model using third party data comprising any non-blockchain data associated with the assertion, wherein the non-blockchain data is obtained via a third party storage medium that is external to the blockchain.

The AI modeling module 214 may be implemented by a computer system that is separate and distinct from process acceleration computer system 200. However, it should be appreciated that, in some embodiments, the AI modeling module may be implemented by process acceleration computer system 200, in combination with the other functionality described herein. Accordingly, in the embodiment shown in FIG. 2, process acceleration computer system 200 performs operations associated with the following systems illustrated in FIG. 1: the process acceleration computer system 102, and the AI modeling computer system 104.

The consensus probability module 216 is configured to use the AI model (created by the AI modeling module 214) to compute an index value that indicates a probability that consensus will be reached for an assertion placed on the blockchain. An assertion is a record of a statement that an action has been performed at a past point in time, is currently being performed at the present time, or will be performed at a future time. An assertion is generally placed on a distributed ledger (DL) of a blockchain to become a transaction by an entity (e.g., person, organization, business) associated with an assertor blockchain node. Any blockchain node of the network of blockchain nodes may be an "assertor" blockchain node. When referring to a particular assertion, the assertor blockchain node is the node that has placed the particular assertion on the DL of the blockchain. Consensus is an agreement between a predefined, minimum quantity of nodes of the blockchain network, that the assertion is valid and becomes a transaction on the blockchain. Agreement includes affirmative assent that the assertion is valid, by each individual one of the minimum quantity of nodes. Time is required for agreement to be reached. Each individual node provides assent according to its own choice and timeline. Thus, consensus (i.e., agreement between the minimum number of the blockchain nodes) may or may not be reached, and if reached, may require any period of time.

The consensus probability module 216 first computes the index value, using the AI model, and then analyzes the index value to determine whether the probability is high enough to indicate that consensus for the assertion will occur. To do this, the consensus probability module 216 compares the probability to a predefined threshold that is the minimum acceptable probability of consensus for the assertion, and when the computed probability meets or exceeds the threshold, then the consensus probability module 216 determines that consensus for the assertion will be reached, at some future point in time.

In some embodiments, the consensus probability module 216 monitors the index value during a time delay that occurs, either: (i) between placing the assertion on the blockchain and reaching consensus; or (ii) between placing the assertion on the blockchain and initiating execution of action items associated with the assertion. The consensus probability module 216 monitors the index value by computing updated index values during the time delay, and comparing the updated index values to the predefined threshold (i.e., the minimum acceptable probability that consensus will be reached). If an updated index value does not meet or exceed the predefined threshold, the process initiation module 220 may be triggered to provide a notification to the entity making the assertion (e.g., an assertor blockchain node), and/or to terminate any action items that have been initiated (by the process initiation module 220) in response to the initial computation of an acceptable index value (by the consensus probability module 216).

The consensus timing module 218 is configured to predict the duration of a time delay occurring between placing an assertion on the blockchain and achieving consensus for the assertion. The consensus timing module 218 computes the predicted time duration before consensus is reached using the AI model and the historical data from the blockchain. The consensus timing module 218 is further configured to use the predicted duration of time to determine whether early execution of action items corresponding to the assertion provides a benefit to the assertor blockchain node. The consensus probability module 216 uses an AI model to compute a probability that may or may not indicate that consensus for the assertion will eventually be reached by the required number of nodes of the blockchain. When consensus is indicated, the process initiation module 220 initiates the early execution of action items that correspond to the assertion (i.e., action items are executed before actually reaching consensus).

However, in certain embodiments, the consensus timing module 218 determines that the time duration between assertion and consensus is not long enough to gain a benefit from early execution of action items corresponding to the assertion. In other words, when consensus is predicted to occur within a few minutes of early execution of the action items, then early execution of the action items may be unnecessary or not worth the risk of incorrectly anticipating the outcome of the consensus. In this example, the consensus timing module 218 may terminate or cancel the early execution of the action items, or the consensus timing module 218 may terminate or cancel a command to initiate the early execution of the action items, wherein early execution occurs before consensus is reached.

The process initiation module 220 initiates the execution of action items, tasks, or processes corresponding to the assertion, when the consensus probability module 216 determines that consensus for the assertion will be reached, at some future point in time. Initiated action items may include: (1) computer-based processes executed directly by the process acceleration computer system 200; or (2) other tasks that require completion by the entity, wherein the process acceleration computer system 200 initiates performance of these tasks by the entity via automatically generated, transmitted, and/or displayed notifications or alerts. Thus, when the index value meets or exceeds the predefined threshold, the process initiation module 220 executes computer-based instructions to complete the action item directly, or generates, transmits, and/or displays a notification for entity performance of the action item.

In practice, the blockchain node module 212, the AI modeling module 214, the consensus probability module 216, the consensus timing module 218, and/or the process initiation module 220 may be implemented with (or cooperate with) the at least one processor 202 to perform at least some of the functions and operations described in more detail herein. In this regard, the blockchain node module 212, the AI modeling module 214, the consensus probability module 216, the consensus timing module 218, and/or the process initiation module 220 may be realized as suitably written processing logic, application program code, or the like.

Figure 3:
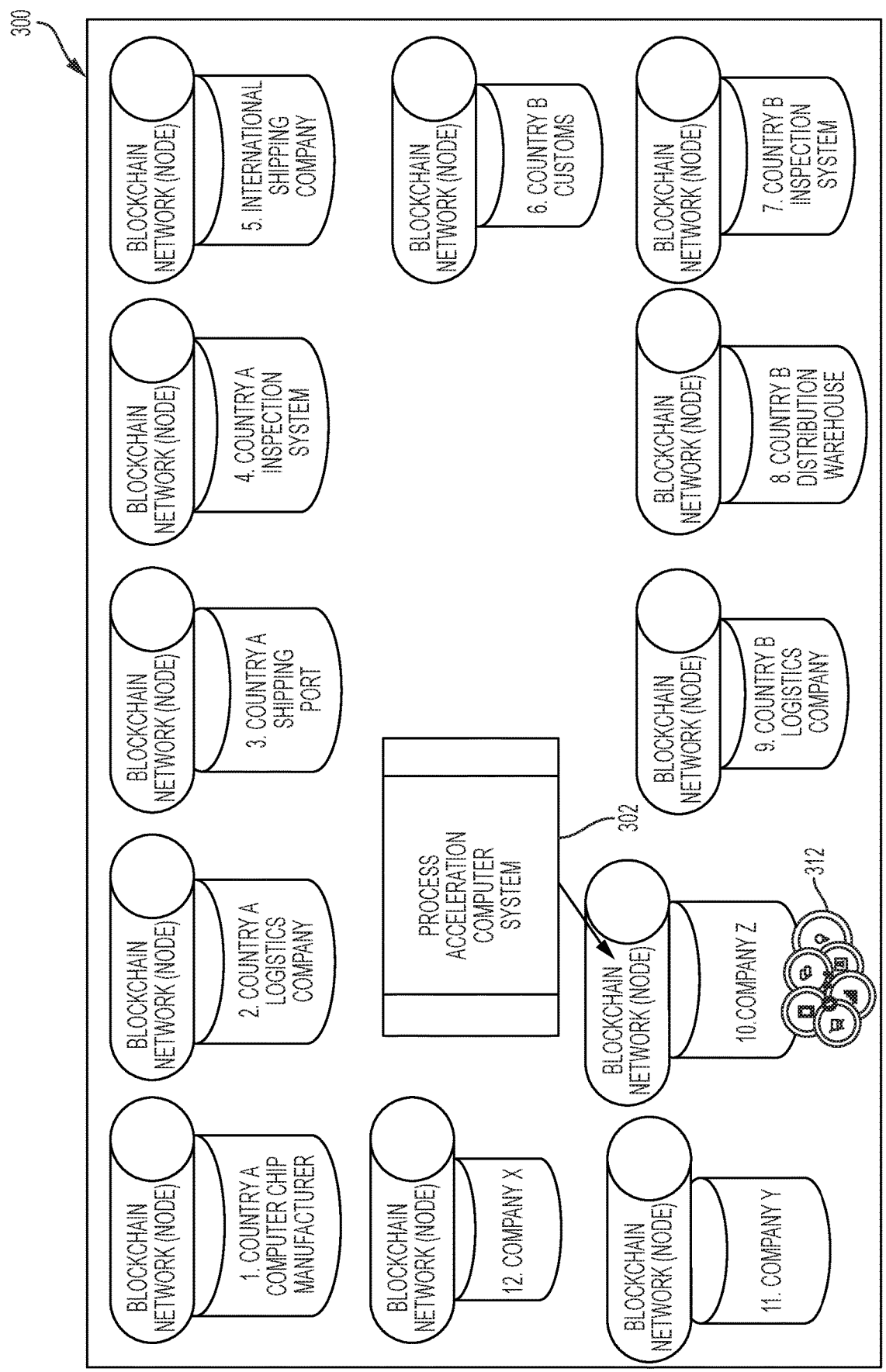
FIG. 3 is a diagram of a network of blockchain nodes, in accordance with the disclosed embodiments.

FIG. 3 is a diagram of a network of blockchain nodes 300, in accordance with the disclosed embodiments. It should be noted that the network of blockchain nodes 300 can be implemented with the network of blockchain nodes 106 depicted in FIG. 1. In this regard, the network of blockchain nodes 300 shows certain elements and components of the network of blockchain nodes 106 in more detail. FIG. 3 illustrates one particular example application using a blockchain network: managing and tracking the shipment of goods via a supply chain. It should be appreciated that the system for accelerating processes for an entity associated with a blockchain node (see reference 100, FIG. 1), as described herein, may be implemented and used for any application of a blockchain network. Examples of applications using blockchain technology, and which may implement a system for accelerating processes for an entity associated with a blockchain node, may include, without limitation: "smart" contract applications; peer-to-peer transactions associated with the "sharing economy"; political and government applications (e.g., polling, voting in elections); corporate governance; supply chain auditing; file storage and data management; and the like.

In the example described herein, the network of blockchain nodes 300 is tracking supply chain information including, but not limited to: product names, quantity, shipping origination and destination locations, and the like. A blockchain has been created and replicated across each one of the network of blockchain nodes 300, and the blockchain is continually updated as entities associated with nodes (of the network of blockchain nodes 300) operate in the supply chain and continually place assertions on the blockchain, wherein the assertions detail supply chain transactions and operations.

As shown, the network of blockchain nodes 300 includes a process acceleration computer system 302 (see reference 102, FIG. 1; reference 200, FIG. 2). The process acceleration computer system 302 is a node of the network of blockchain nodes 300, in addition to including the capability of performing process acceleration functionality, as described herein. Process acceleration functionality may be implemented as a software application or other type of module of executable code that is stored, maintained, and executed by the process acceleration computer system 302. The process acceleration software application accesses, receives, or otherwise obtains data (e.g., historical blockchain data, current blockchain data, blockchain data updates) from the internally, stored copy of the blockchain. As the blockchain information is continually updated by the network of blockchain nodes 300, each of the nodes receives the updated blockchain data, and stores the updated blockchain data internally or locally. In some embodiments, each of the nodes stores the updated blockchain data on an internally-stored copy of the blockchain. In addition to performing this blockchain-updating functionality, the process acceleration computer system 302 also directs the updated blockchain data to the internal process acceleration software application, for use in accelerating execution of consensus-triggered action items 312 corresponding to an assertion, prior to reaching consensus for the assertion.

The process acceleration computer system 302 initiates creation of an artificial intelligence (AI) model. During completion of typical operations and transactions by the network of blockchain nodes 300, an assertor node computer system places an assertion on the blockchain by updating internally-stored blockchain records and transmitting the updated blockchain information to the blockchain. The updated blockchain data (i.e., the assertion) is propagated throughout the network of blockchain nodes 300, and each node revises an internal or local copy of the blockchain, using the updated blockchain data.

When consensus is reached for the new information (i.e., the assertion) that is posted, the process acceleration computer system 302 packages the new record (i.e., the assertion) on the blockchain, including: (1) whether the assertion was accepted or rejected; (2) the posted data included in the assertion; (3) identification of the assertor node computer system submitting the record; (4) the duration of time elapsed before consensus was reached; (5) whether the consensus was unanimous among the network of blockchain nodes 300 or the associated percentage of consensus; (6) identification of nodes included in the consensus; (7) identification of any nodes that contradicted the consensus, and (8) identification of invoked blockchain functions. The process acceleration computer system 302 also continues to monitor the blockchain for new updated records (i.e., new assertions) that are confirmed (i.e., reached consensus). When new assertions reach consensus, the process acceleration computer system 302 packages the new records as a transaction, as well.

The process acceleration computer system 302 then submits a request to the AI computer system (not shown) to create and/or update an AI model for use to analyze future assertions placed on the blockchain. The AI computer system uses the packaged records provided as input to create, train, or otherwise update the AI model, based on AI algorithms described previously with regard to FIG. 1. The AI computer system then transmits the created or updated AI model to the process acceleration computer system 302 for use in analysis.

After initiating creation of an artificial intelligence (AI) model, the process acceleration computer system 302 uses the AI model and the data stored on the blockchain to accelerate execution of consensus-triggered action items 312 corresponding to an assertion, prior to reaching consensus for the assertion. The process-acceleration functionality begins with an assertion placed on the blockchain, by an assertor node computer system that updates internally-stored blockchain records with the assertion and pushes the assertion to the blockchain. Before consensus is reached for the assertion, the process acceleration computer system 302 obtains the new information associated with the assertion and relevant historical detail regarding the new assertion. The process acceleration computer system 302 packages the new record (i.e., the assertion), including: (1) identification of the AI model relevant to the assertion; (2) the posted data of the assertion; (3) identification of the assertor node computer system submitting the record; (4) identification of connected nodes; (5) identification of invoked action items 312 corresponding to the assertion; and (6) any other relevant data based on the design that impacts consensus and time (e.g., weather, date, time).

The process acceleration computer system 302 then sends a request to AI for evaluation of the assertion, based on the packaged record of the assertion and associated data. The AI computer system scores the new data (i.e., the assertion, the packaged record) in relation to the known AI model history, and generates and transmits a response to the process acceleration computer system 302. The response includes at least an index value indicating a probability that consensus for the assertion will be reached at any future point in time. Optionally, the response may also include one or more of the following: a duration of time until consensus is likely reached; one or more updated index values and an indication of whether consensus is more or less likely, based on the updated index values; and other AI-predicted, blockchain-specific variables that may be used to evaluate the assertion.

Based on the response, the process acceleration computer system 302 evaluates the index value and one or more action items 312 corresponding to the assertion. The action items 312 are identified by the assertion placed on the blockchain. When the process acceleration computer system 302 determines that the index value indicates that consensus for the assertion is not likely to occur, then the process acceleration computer system 302 does not initiate execution of the action items 312 corresponding to the assertion. However, in some embodiments, the process acceleration computer system 302 may generate and transmit a notification to the assertor node computer system, to inform the associated entity that consensus is unlikely.

However, when the process acceleration computer system 302 determines that the index value indicates that consensus for the assertion is likely to occur at some future time, then the process acceleration computer system 302 initiates execution of the one or more action items 312, by either directly executing computer-based processes, or executing the generation and transmission of a notification to an entity associated with the assertion, such that the entity is informed of appropriate conditions for performing the corresponding action items 312. For the illustrated embodiment of the network of blockchain nodes 300, the directly executed processes are applicable to managing and tracking the shipment of goods via a supply chain. Examples of the directly executed computer-based processes may include, without limitation: updating order data on a website or computer system associated with the entity; presenting a shipping status and/or location via a website or computer system associated with the entity, or the like.

By initiating execution of the one or more action items 312 prior to reaching consensus, the process acceleration computer system 302 reduces or eliminates the time delay that exists between placement of the assertion on the blockchain and execution of consensus-triggered action items 312. Although the action items 312 are executed earlier than the point in time at which consensus is reached, the process acceleration computer system 302 continues to monitor the assertion placed on the blockchain for additional data. Once consensus is reached, the process acceleration computer system 302 obtains the consensus data, which is updated blockchain data, and transmits the consensus data for use as feedback to improve the AI model. Additionally, the process acceleration computer system 302 may provide the evaluation data (e.g., computation and evaluation of the index value, applicable AI model data) to the remaining nodes of the network of blockchain nodes 300. Shipping and logistics entities associated with the network of blockchain nodes 300 may subscribe to the process acceleration computer system 302, in order to receive the evaluation data described herein.

Figure 4:
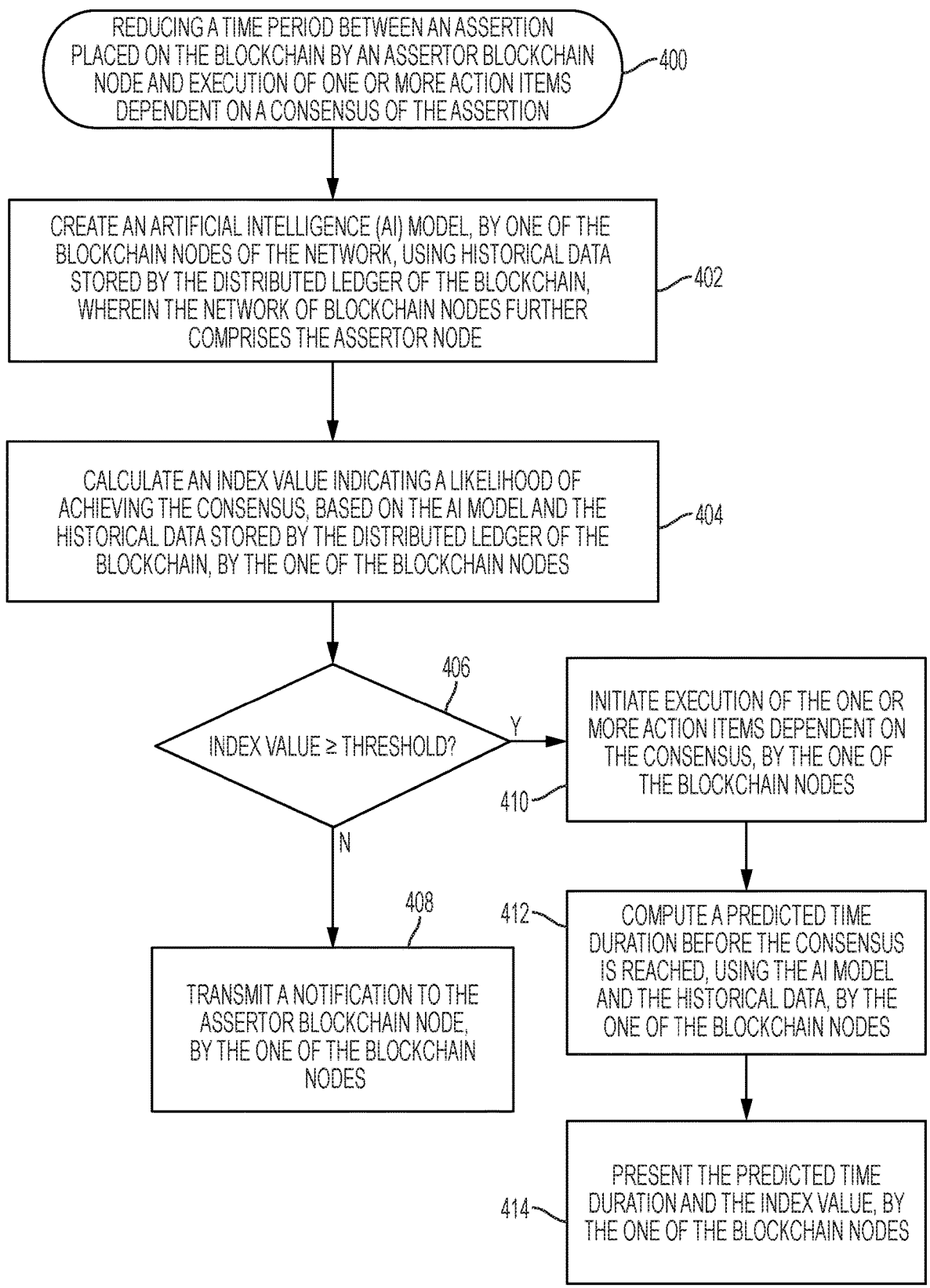
FIG. 4 is a flow chart that illustrates an embodiment of a process for reducing a time period between an assertion placed on the blockchain and execution of one or more action items dependent on a consensus of the assertion, in accordance with the disclosed embodiments.

FIG. 4 describes a method for using a distributed ledger of a blockchain, applicable to a network of blockchain nodes. More specifically, FIG. 4 is a flow chart that illustrates an embodiment of a process 400 for reducing a time period between: (i) an assertion placed on the blockchain, by an assertor blockchain node, and (ii) execution of one or more action items dependent on a consensus of the assertion, in accordance with the disclosed embodiments.

First, the process 400 creates an artificial intelligence (AI) model, by one of the blockchain nodes of the network, using historical data stored by the distributed ledger of the blockchain, wherein the network of blockchain nodes comprises the assertor blockchain node (step 402). The AI model is a simulated blockchain model used for purposes of assessing current and historical blockchain conditions, and identifying the likelihood or probability of the existence of future blockchain conditions. Within the context of the present disclosure, the AI model is used to compute an index value indicating a probability that consensus for a particular assertion will be reached. The AI model may be a model of the assertor node of the blockchain, a model of a subset of nodes of the blockchain network, or a model of the entirety of the blockchain network.

Historical data used to create the AI model may include, without limitation: data or records posted to the distributed ledger; identification of the node (or entity associated with the node) that posted a particular dataset or record to the distributed ledger; a duration of the time period required to reach consensus for a particular dataset or record posted to the distributed ledger; whether consensus was unanimous for a particular dataset or record posted to the distributed ledger; identification of nodes in agreement for consensus for a particular dataset or record posted to the distributed ledger; particular blockchain functions invoked for a particular dataset or record posted to the distributed ledger; or the like. It should be appreciated that the list of historical data used to create the AI model is not exhaustive, and that the process 400 may use any data or records stored by the distributed ledger of the blockchain to create or update the AI model.

The process 400 then calculates an index value indicating a likelihood of achieving the consensus, based on the AI model and the historical data stored by the distributed ledger of the blockchain, by the one of the blockchain nodes (step 404). The index value is a probability that consensus for the assertion will eventually be reached. An assertion is a record of a statement that an action has been performed at a past point in time, is currently being performed at the present time, or will be performed at a future time. An assertion is generally placed on a distributed ledger of a blockchain by an entity (e.g., person, organization, business) associated with an assertor blockchain node. Any blockchain node of the network of blockchain nodes may be an "assertor" blockchain node. When referring to a particular assertion, the assertor blockchain node is the node that has placed the particular assertion on the distributed ledger of the blockchain.

Consensus is an agreement between a predefined, minimum quantity of nodes of the blockchain network, that the assertion is valid. Agreement includes affirmative assent that the assertion is valid, by each individual one of the minimum quantity of nodes. Nodes of the blockchain network can reach agreement in a few ways. As a first example, the blockchain nodes can evaluate an assertion using a "proof of work" process, by performing complex mathematical operations to determine whether the assertion is valid and whether the assertor node had "worked" to prove it first. As a second example, nodes of the blockchain network can evaluate an assertion using a "proof of stake" process, wherein the blockchain nodes allowed to accept an assertion and convert the assertion into a transaction must have a stake in the network, indicating that an entity or participant associated with the evaluating node is presumably concerned that the information is valid. Then, as a particular node evaluates the transaction and agrees that the assertion is valid, the particular node places the assertion on the blockchain as the transaction. Thus, when fifty-one percent (51%) of the nodes of the blockchain network (and therefore, entities or participants associated with the nodes) holding stake agree, then the blockchain network assumes the assertion (and therefore, the transaction) is valid and continues operations. Alternatively, the blockchain nodes can evaluate an assertion using other "proof of" processes, wherein each node evaluating the assertion performs any applicable algorithm or evaluative process to determine whether the assertion is valid.

Agreement is expressed by a node evaluating the assertion in relation to its copy of the DL, then placing the information from the assertion on the blockchain as a new transaction and broadcasting the new transaction. Assuming other nodes receiving the new transactions do not have conflicting messages (i.e., "double spend"), then most or all of the nodes will receive the new transaction, and the network achieves consensus for the assertion (and thus, the transaction) when the desired volume of nodes have also included the new transaction on each of their copies of the DL (e.g., 51% of the nodes). Time is required for agreement to be reached. Each individual node provides or withholds assent according to its own data, process, and timeline. Thus, consensus (i.e., agreement between the minimum number of the blockchain nodes) may or may not be reached, and if reached, may require any period of time.

Embodiments of a network of blockchain nodes may be used for the shipment of goods. As one example, a computer system is used to scan packages, and a communicatively coupled scanner is considered a node of the blockchain which may provide (or withhold) assent based on the results of scanning the package (e.g., expected scanning results versus actual scanning results). As another example, when the shipping goods are based on weight and an internet-connected scale is used to weigh the goods, and function as a node of the blockchain. Here, an expected weight measurement from the scale may be identified and provided as assent. As a third example, when an order status for a shipment of goods is maintained and updated via a website that is connected to the blockchain network, then updated order status information may be provided as assent.

In step 404, the process 400 uses the AI model and the historical data of the blockchain to calculate an index value indicating a probability that consensus for the assertion will be reached, or in other words, that the required minimum quantity of blockchain nodes will join the agreement that the assertion is valid. The process 400 uses artificial intelligence (AI) algorithms, recorded past circumstances, and results that have previously occurred, to create and update the AI model. The AI model is then used to make an intelligent prediction of outcome for the assertion made by the assertor node.

After calculating the index value (step 404), the process 400 determines whether the index value is greater than or equal to a predefined threshold (decision 406). The predefined threshold is a minimum probability value indicating that consensus for the assertion is likely to be reached. The predefined threshold is based on the risks and benefits of correctly or incorrectly performing the action. For example, the predefined threshold to initiate notifying a participant or entity (e.g., person, business, organization) that a package has arrived in a particular country and is being reviewed by customers is low, because in this case, there is no required action on the part of the customer. The risk of the assertion being incorrect is low, and therefore the predefined threshold is low. However, the predefined threshold to notify a customer that the package has arrived at a store for customer pick-up is high, because in this case, the customer is required to take action dependent upon accuracy of the assertion (e.g., that the packaged is located at the store and is waiting for pick-up). The risk of the assertion being incorrect is high, due to the potential for customer dissatisfaction, and therefore the predefined threshold is high. Although both of the aforementioned "package location assertion" updates would be the same on the blockchain, each requires a different threshold for acceptance prior to initiating execution of one or more particular action items, wherein the action items are normally triggered by achieving consensus.

When the index value is not greater than or equal to the predefined threshold (the "No" branch of 406), the process 400 transmits a notification to the assertor blockchain node, by the one of the blockchain nodes (step 408). The transmitted notification alerts the entity (e.g., person, organization, business) associated with the assertor blockchain node that the probability of reaching consensus is less than a predefined threshold of acceptability. Index values less than the predefined threshold indicate a low probability that consensus will eventually be reached for the assertion, and therefore, execution of action items that are dependent on consensus is not initiated by the process 400. Notification may include logging as a system transaction for future review; transmitting an email message or Short Messaging Service (SMS) message to a human for manual intervention; initiating execution of a computer-executed process or automatically-transmitted notification in response to a condition indicating a potential failed assertion, which may indicate fraud on the blockchain; or performing no action and permitting the consensus process to continue without an advance prediction action.

When the index value is greater than or equal to the predefined threshold (the "Yes" branch of 406), the process 400 initiates execution of the one or more action items dependent on the consensus, by the one of the blockchain nodes (step 410). Index values greater than or equal to the predefined threshold indicate a probability value that is high enough to signify that consensus will eventually be reached for the assertion, and therefore, execution of action items that are dependent on consensus is appropriately initiated by the process 400. The one or more action items are activities appropriate for performance under the condition of consensus for the assertion. In other words, when a required minimum quantity of blockchain nodes agrees that the assertion is valid, then an action item associated with the assertion is an appropriate response by the assertor node and/or the entity (e.g., person, organization, business) associated with the assertor node.

However, instead of waiting for consensus to be reached for the assertion, the process 400 computes an index value (prior to reaching consensus) to determine a probability that consensus will be reached for this particular assertion, at any point in the future. Under normal circumstances (prior to the implementation of process 400), the action items are usually performed when consensus is reached among the required number of nodes. Here, however, performance of the action items is initiated by the process 400 when the index value indicates that consensus will eventually be reached. Thus, the "trigger" for performance of action items associated with the assertion is no longer the achievement of actual consensus; instead, the process 400 is triggered to initiate performance of action items by a determination that consensus is likely to be reached. The typical delay between placing an assertion on the blockchain and performing action items associated with the assertion, is therefore reduced or eliminated.

Action items may be computer-executable processes or other types of activities that are normally performed in response to reaching a consensus for the assertion. In other words, the action items are usually triggered by reaching consensus (i.e., consensus-triggered action items). The process 400 initiates execution of the action items using by: (1) automatically notifying the assertor node or entity associated with the assertor node that consensus is likely to be reached and, therefore, the entity should proceed with performing the one or more action items; and/or (2) automatically executing computer-based processes for performing the one or more action items.

In some embodiments, after initiating the execution of the action items (step 410), the process 400 computes a predicted time duration before consensus is reached, using the AI model and the historical data, by the one of the blockchain nodes (step 412). The process 400 then presents the predicted time duration and the index value, by the one of the blockchain nodes (step 414). As stated previously, the process 400 reduces the time period between an assertion placed on the blockchain and execution of one or more action items dependent on a consensus of the assertion. More specifically, the process 400 permits execution of the action items prior to reaching consensus for the assertion, based on the calculated index value. Since the process 400 is not waiting for consensus to trigger execution of the action items, the process 400 reduces or eliminates the delay between the time at which the assertion is placed on the blockchain and the time at which the action items are completed.

The predicted time duration may be a period of time between (i) placing the assertion on the blockchain and reaching actual consensus for the assertion; or (ii) initiating execution of the action items associated with the assertion and reaching actual consensus for the assertion. When the predicted time duration is the period of time between placing the assertion on the blockchain and reaching consensus, then the predicted time duration represents a delay that has been reduced by performance of the process 400. When the predicted time duration is the period of time between initiating execution of the action items and reaching consensus, then the predicted time duration represents a delay that has been eliminated by performance of the process 400. The process 400 may transmit and/or present the predicted time duration and the index value, by the one of the blockchain nodes, such that an entity (e.g., person, organization, business) associated with the one of the blockchain nodes is informed of the calculated index value indicating the probability that consensus will eventually be reached, and the delay that has been reduced or eliminated via performance of the process 400.

Figure 5:
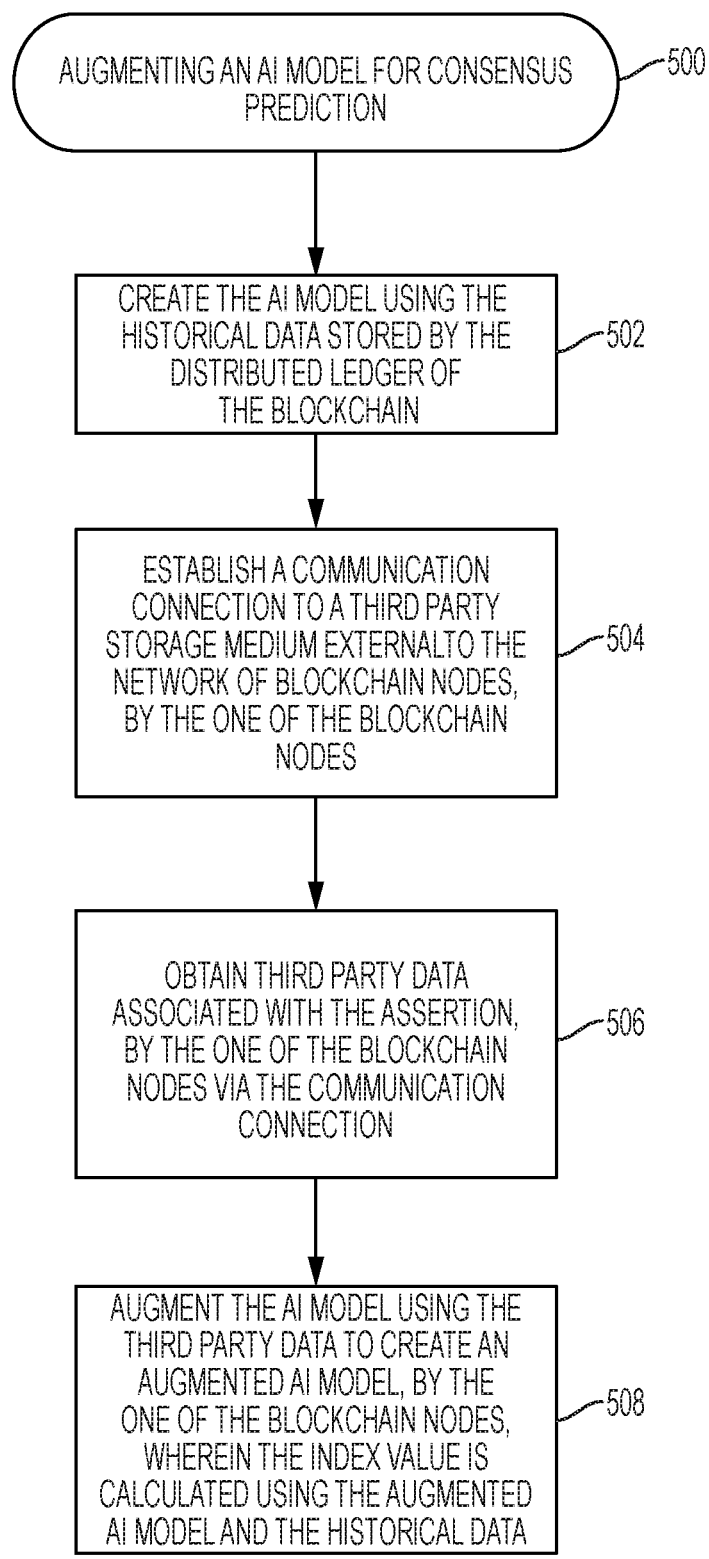
FIG. 5 is a flow chart that illustrates an embodiment of a process for augmenting an Artificial Intelligence (AI) model for consensus prediction, in accordance with the disclosed embodiments.

FIG. 5 is a flow chart that illustrates an embodiment of a process 500 for augmenting an Artificial Intelligence (AI) model for consensus prediction, in accordance with the disclosed embodiments. As described previously with regard to FIG. 4, the AI model is used by at least one node of the network of blockchain nodes, and is created using data stored by the distributed ledger of the blockchain. The process 500 is used to augment the AI model, such that the AI model includes third party data that is not stored by the blockchain itself The process 500 begins by creating an AI model using the historical data stored by the distributed ledger of the blockchain (step 502). The AI model is a simulated blockchain model used for purposes of assessing current and historical blockchain conditions, and identifying the likelihood or probability of the existence of future blockchain conditions. The AI model may be a model of the assertor node of the blockchain, a model of a subset of nodes of the blockchain network, or a model of the entirety of the blockchain network.

The historical data used to create the AI model comprises at least current assertion data, current assertor identity data, historical assertion data, historical consensus acceptance data, historical consensus node data, and historical consensus timing data. The historical data may also include, without limitation: data or records posted to the distributed ledger; identification of the node (or entity associated with the node) that posted a particular dataset or record to the distributed ledger; a duration of the time period required to reach consensus for a particular dataset or record posted to the distributed ledger; whether consensus was unanimous for a particular dataset or record posted to the distributed ledger; identification of nodes in agreement for consensus for a particular dataset or record posted to the distributed ledger; particular blockchain functions invoked for a particular dataset or record posted to the distributed ledger; or the like. It should be appreciated that the list of historical data used to create the AI model is not exhaustive, and that the process 400 may use any data or records stored by the distributed ledger of the blockchain to create or update the AI model. Additionally, as described below, the process 400 may also use any data or records stored by third party sources.

The process 500 establishes a communication connection to a third party storage medium external to the network of blockchain nodes, by the one of the blockchain nodes (step 504). As described previously with regard to FIG. 1, the communication connection may be a wired or wireless connection between a computer system associated with the blockchain (e.g., a process acceleration computer system 102, an assertor node computer system 108, and/or any one of the network of blockchain nodes 106) and the third party storage medium. The third party storage medium is any computing hardware that is used for storing data files and objects, which can store information both temporarily and permanently, and can be internal or external to a computer, server or any similar computing device. Examples of the third party storage medium may include one or more servers, computer systems with internal memory hardware, an external memory device, or the like.

As described herein, the third party storage medium is external to the network of blockchain nodes, and stores data that is not directly available to the blockchain. Here, the process 500 establishes a communication connection to the third party storage medium, such that the third party data is accessible by the process 500, for purposes of creating, updating, and/or updating the AI model.

After establishing the communication connection (step 504), the process 500 obtains third party data associated with the assertion, by the one of the blockchain nodes via the communication connection (step 506). Third party data associated with an assertion is any stored information relevant to validity of the assertion and a probability of achieving consensus for the assertion. For example, when an assertion is associated with operations of a supply chain, the third party data may include weather data which may impact shipping times in the supply chain. As another example, when an assertion is associated with receiving a government approval of some kind, the third party data may include wait times for services that would impact government approvals. As an additional example, when an assertion is associated with cooperative services performed by an assertor entity and a separate and distinct second entity, the third party data may include timeliness of cooperative services performed by entities other than the entity associated with the assertor node.

The process 500 augments the AI model using the third party data to create an augmented AI model, by the one of the blockchain nodes, wherein the index value is calculated using the augmented AI model and the historical data (step 508). The obtained third party data is used to provide additional context to the AI model, for a more complete representation of historical blockchain interactions and corresponding results occurring in the blockchain environment, and potential results based on current and future blockchain interactions (e.g., assertions placed on the blockchain, one or more nodes affirming consensus). More specifically, the third party data allows the AI model to provide a more accurate prediction of whether or not consensus will be reached for a particular assertion (e.g., a determined probability of achieving the consensus), and the speed of achieving consensus for the assertion among the network of blockchain nodes.

Figure 6:
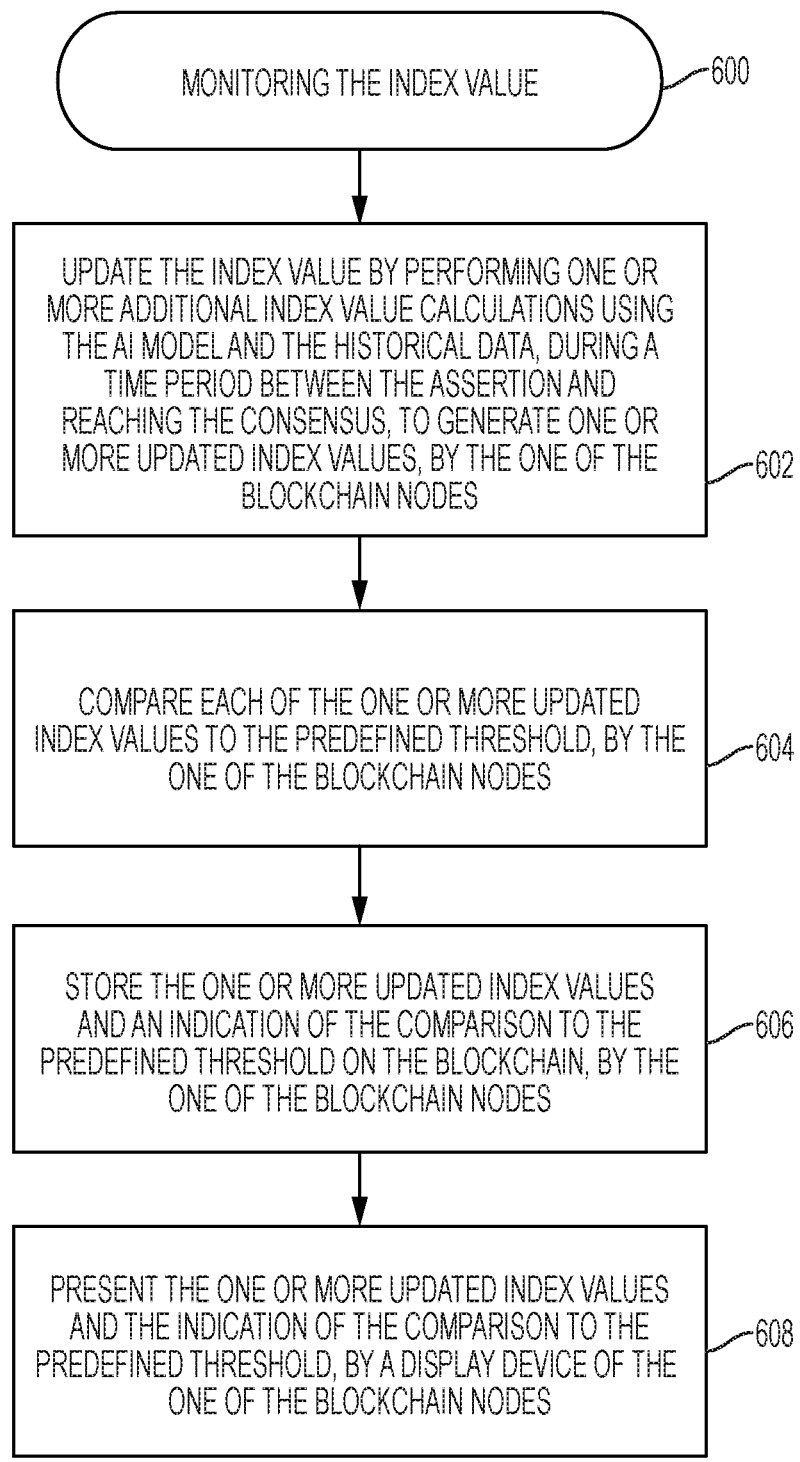
FIG. 6 is a flow chart that illustrates an embodiment of a process for monitoring an index value for consensus prediction, in accordance with the disclosed embodiments.

FIG. 6 is a flow chart that illustrates an embodiment of a process 600 for monitoring an index value for consensus prediction, in accordance with the disclosed embodiments. The index value is a probability that consensus for the assertion will eventually be reached, and the index value for an assertion is generally calculated when the assertion is placed on the blockchain. However, there is a time period between placement of the assertion on the blockchain and reaching consensus. During this time period, the process 600 "monitors" the index value by (1) computing updated index values based on updated, current conditions of the blockchain and a corresponding, updated AI model; and (2) comparing the updated index values to the predefined threshold to evaluate whether the probability continues to be high enough to indicate that consensus for the assertion will be reached. The index value is monitored to provide an assertor (e.g., the assertor node and/or an entity associated with the assertor node) with one or more notifications of continued progress toward consensus for the assertion, notifications of stagnation in progress toward consensus, or a reversal in probability values away from a likely consensus.

The process 600 updates the index value by performing one or more additional index value calculations, during a time period between placing the assertion on the blockchain and reaching the consensus (step 602). The additional index value calculations are performed after an initial index value has been computed (see FIG. 4, reference 404) and determined to be greater than or equal to a predefined threshold (see reference 406), resulting in initiating the execution of action items associated with the assertion (see reference 408).

Here, the process 600 begins monitoring the index value of the assertion by performing one or more additional index value calculations to generate one or more updated index values. As in the calculation of the initial index value (see FIG. 4, reference 404), the additional index value calculations are performed using the artificial intelligence (AI) model and the historical data. However, because the additional index value calculations are performed at later times (e.g., as a series of index value calculations performed sequentially during the period of time between assertion and consensus), and the AI model and the historical data are updated in real-time, then each of the calculations of one updated index value uses a distinct set of input data. For example, at time (t), a first index value at time (t) is computed using the AI model at time (t) and the historical data at time (t). At time (t+1), a second index value is calculated using the AI model at time (t+1) and the historical data at time (t+1). The first index value and the second index value are computed using two different sets of input data, due to the updating of the AI model and the historical data (i.e., data stored by the blockchain) that occurs between time (t) and time (t+1). Thus, each of the one or more index value calculations may be different, and indicate a different probability that consensus for the assertion will be reached.

The process 600 then compares each of the one or more updated index values to the predefined threshold, by the one of the blockchain nodes (step 604). The predefined threshold is a minimum probability value indicating that consensus for the assertion is likely to be reached, and as described herein, each of the one or more index values calculated in step 602 is distinct and may be a different value. Here, the process 600 compares each index value to the predefined threshold, and the result of the comparison is an indication of whether the probability of achieving consensus for the assertion remains the same, increases, or decreases. The result may further indicate whether the probability of achieving consensus continues to exceed the threshold (and therefore continues to indicate that consensus will occur), or whether the probability of achieving consensus no longer exceeds the threshold (and therefore no longer indicates that consensus will occur).

The process 600 stores the one or more updated index values and an indication of the comparison to the predefined threshold on the blockchain, by the one of the blockchain nodes (step 606), and in certain embodiments, the process 600 also presents the one or more updated index values and the indication of the comparison to the predefined threshold, by a display device of the one of the blockchain nodes (step 608). Here, the index values and associated indications of the comparison to the predefined threshold may be presented via an updated website presented by the display, an alert or other type of dynamic notification presented by the display, an email or other type of transmitted notification, or the like.

Figure 7:
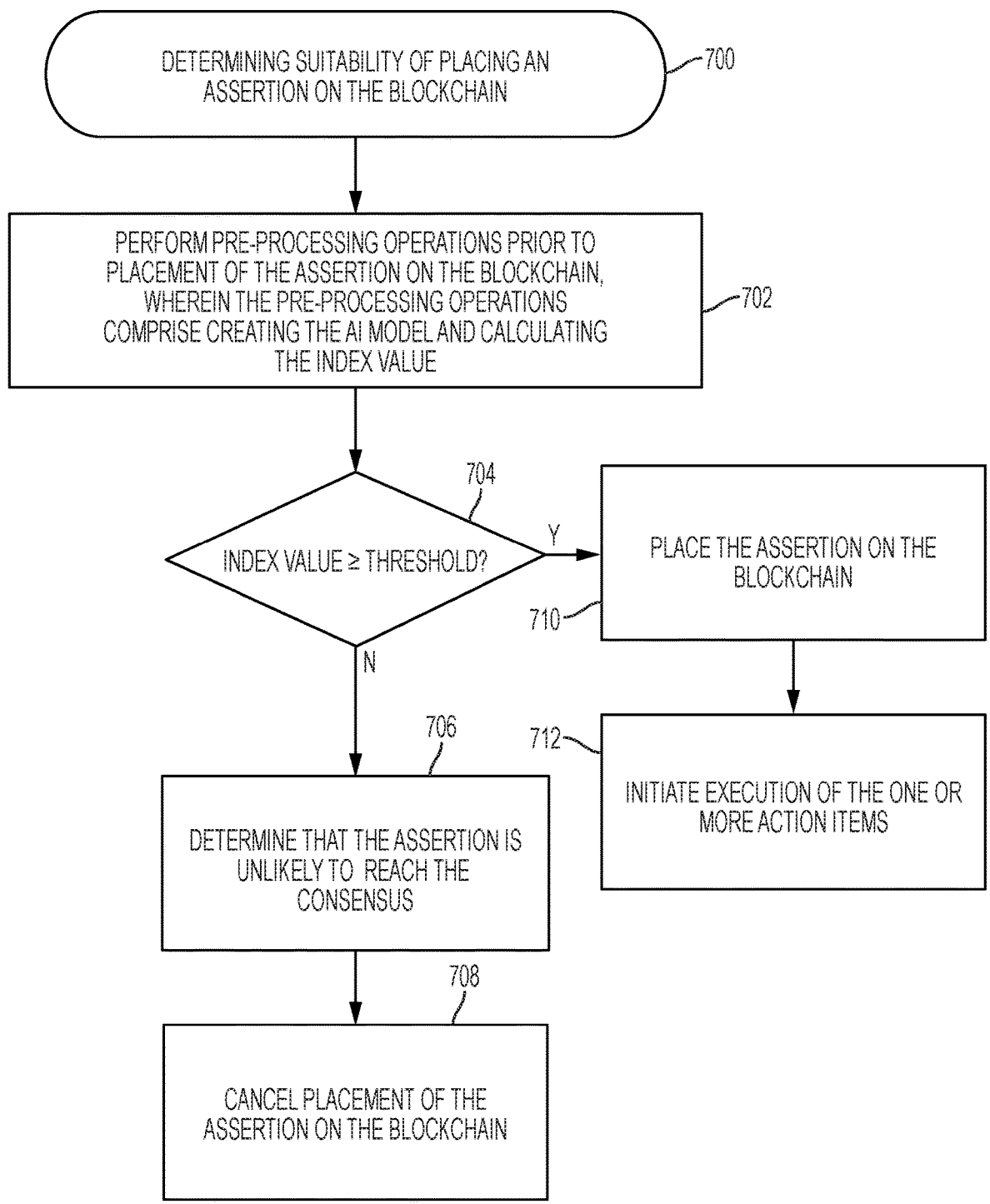
FIG. 7 is a flow chart that illustrates an embodiment of a process for determining suitability of placing an assertion on the blockchain, in accordance with the disclosed embodiments.

FIG. 7 is a flow chart that illustrates an embodiment of a process 700 for determining suitability of placing an assertion on the blockchain, in accordance with the disclosed embodiments. In some embodiments of the present disclosure, the process 700 is performed prior to performance of the process 400 described with regard to FIG. 4. The process 400 of FIG. 4 is performed after an assertion is placed on the blockchain, and the process 700 of FIG. 7 may be performed to first evaluate suitability of placing the assertion on the blockchain. It should be appreciated that the process 700 illustrated by FIG. 7 may be performed by a "test" blockchain (i.e., a simulated blockchain environment that includes all data stored by the blockchain) from which decisions and predictions might be made.

First, the process 700 performs pre-processing operations prior to placement of the assertion on the blockchain (step 702). The pre-processing operations include the previously described steps 402-404 of FIG. 4. Specifically, the pre-processing operations include: (i) creating and/or updating the artificial intelligence (AI) model based on historical and current blockchain data, and (ii) calculating the index value indicating a probability that consensus for the assertion will be reached at any future point in time, wherein the index value is calculated based on the AI model and the historical and current blockchain data.

The process 700 then determines whether the index value is greater than or equal to the predefined threshold (decision 704). As described previously, the predefined threshold is a minimum probability value indicating that consensus for the assertion is likely to be reached. When the index value is not greater than or equal to the predefined threshold (the "No" branch of 704), the process 700 determines that the assertion is unlikely to reach consensus (step 706), and cancels placement of the assertion on the blockchain (step 708). Here, the process 700 designates an assertion associated with the index value below the threshold as unsuitable for placement on the blockchain. Index values less than the predefined threshold indicate a low probability that consensus will eventually be reached for the assertion, and therefore, placement of the assertion on the blockchain is not appropriate.

However, when the index value is greater than or equal to the predefined threshold (the "Yes" branch of 704), the process 700 places the assertion on the blockchain (step 710), and initiates execution of the one or more action items dependent on the consensus, wherein the action items are associated with the assertion (step 712). As described previously with regard to FIG. 4, the predefined threshold is based on the risks and benefits of correctly or incorrectly performing the action. When the risk of the assertion being incorrect is low, then the predefined threshold is low, and when the risk of the assertion being incorrect is high, the predefined threshold is high.

Index values greater than or equal to the predefined threshold indicate a probability value that is high enough to signify that consensus will eventually be reached for the assertion, and therefore, placement of the assertion on the blockchain is appropriately performed by the process 700. As described previously with regard to FIG. 4, the one or more action items are activities appropriate for performance under the condition of consensus for the assertion. In other words, when a required minimum quantity of blockchain nodes agrees that the assertion is valid, then an action item associated with the assertion is an appropriate response by the assertor node and/or the entity (e.g., person, organization, business) associated with the assertor node.

As described herein, the process 400 of FIG. 4 uses the predefined threshold to determine whether it is appropriate to initiate the early execution of one or more action items that would normally be executed upon actually achieving consensus for a particular assertion. In the flowchart of FIG. 4, process 400 determines that, when consensus is likely to be reached for an assertion (as shown by a calculated index value), then the process 400 does not wait for consensus to move forward with initiating execution of the appropriate action items. In contrast, the process 700 of FIG. 7 uses the predefined threshold to determine whether it is appropriate (i.e., the risk level is below the predefined threshold) to complete the earlier-in-time procedure of placing the assertion on the blockchain. Here, the process 700 determines that, when consensus is likely to be reached for an assertion (as shown by the calculated index value), then conditions are appropriate, and the risk level is sufficiently low, to place the assertion on the blockchain.

Figure 8:
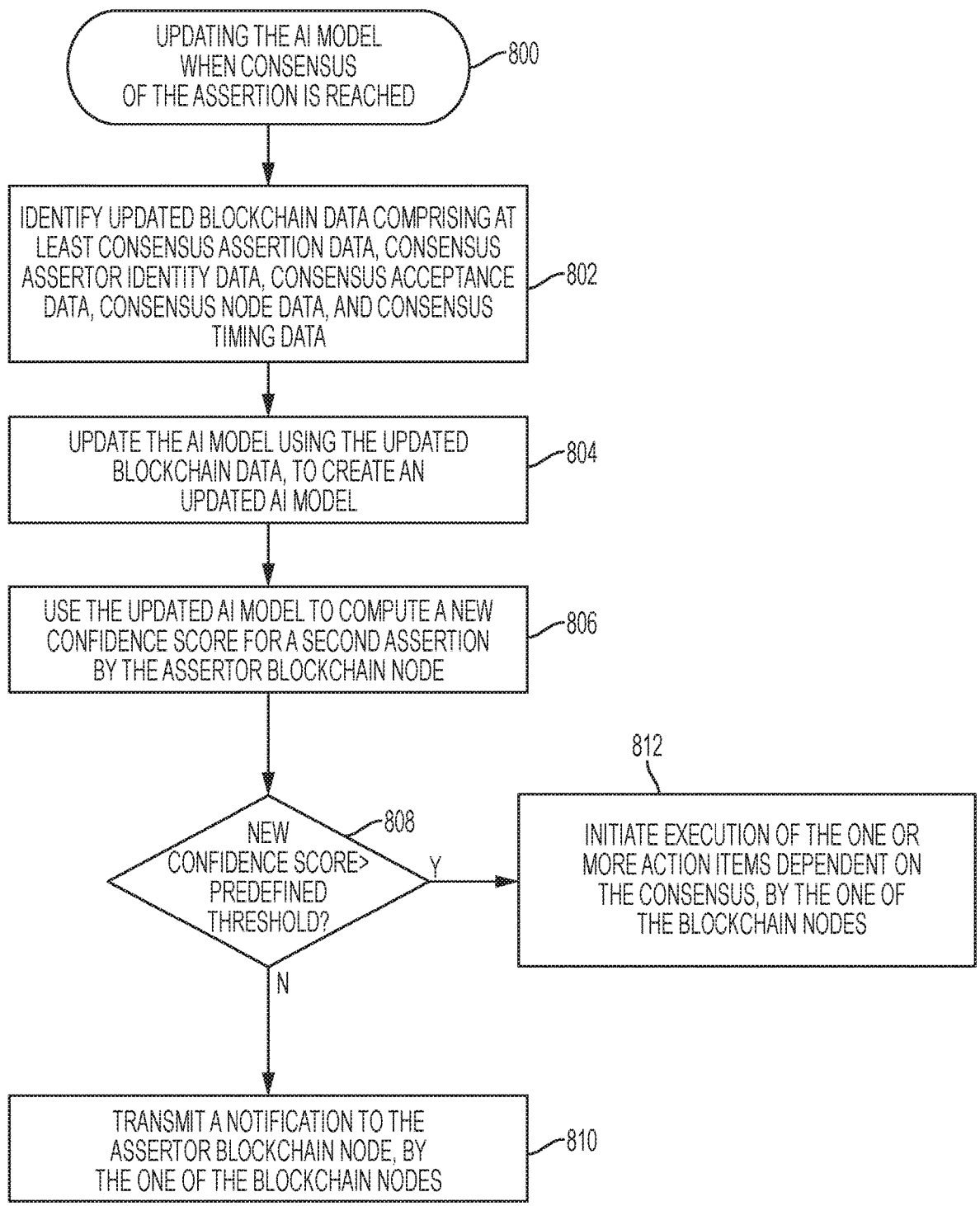
FIG. 8 is a flow chart that illustrates an embodiment of a process for updating an Artificial Intelligence (AI) model when consensus of an assertion is reached, in accordance with the disclosed embodiments.

FIG. 8 is a flow chart that illustrates an embodiment of a process 800 for updating an Artificial Intelligence (AI) model when consensus of an assertion is reached, in accordance with the disclosed embodiments. In some embodiments of the present disclosure, the process 800 is performed after performance of the process 400 described with regard to FIG. 4. It should be appreciated that the process 400 of FIG. 4 creates an AI model for use in evaluating the likelihood that consensus will be reached for a particular assertion, and that the process 800 of FIG. 8 may be performed afterward to update the AI model when consensus of the assertion is reached.

First, the process 800 accesses the distributed ledger (DL) and identifies updated blockchain data (step 802) associated with the assertion and consensus of the assertion. Updated blockchain data is any new blockchain data that was not part of the DL during creation of the first AI model and computation of an initial index value using the first AI model. Here, the process 800 identifies updated blockchain data comprising at least assertion data, assertor identity data, consensus acceptance data, consensus node data, and consensus timing data. The process 800 then updates the AI model using the updated blockchain data, to create an updated AI model (step 804), of the entire network of blockchain nodes or of any subset of the network of blockchain nodes, for use by one or more nodes with proprietary and/or subscription access to the AI model (e.g., a process acceleration computer system).

After updating the AI model (step 804), the process 800 uses the updated AI model to compute a new index value for a second assertion by the assertor blockchain node (step 806). The process 800 uses the same methodology described previously with regard to FIG. 4, to compute the new index value. As described previously with regard to FIG. 4, data associated with assertions made by the same entity (and therefore the same blockchain node), and data associated with previous consensus for assertions made by the same entity, are used to make more intelligent AI decisions regarding probabilities that consensus will be reached for future assertions by the same entity. Each time the assertor blockchain node makes an assertion, whether consensus is reached or not, data is retained and used to update the AI model to achieve increased accuracy in future computations of the index value.

The process 800 determines whether the new index value (associated with the second assertion) is greater than or equal to the predefined threshold (decision 808). The new index value is associated with a new assertion (i.e., the second assertion) by the same entity associated with assertor blockchain node. Here, the process 800 determines whether the probability of reaching consensus for the second assertion is greater than or equal to a minimum required probability for performance of action items dependent upon reaching consensus. When the new index value is not greater than or equal to the predefined threshold (the "No" branch of 808), then the process 800 transmits a notification to the assertor blockchain node (step 810), to inform an entity associated with the assertor blockchain node that the new index value indicates a low probability that consensus for the assertion will be reached. When the new index value is greater than or equal to the predefined threshold (the "Yes" branch of 808), then the process 800 initiates execution of the one or more action items dependent on the consensus, by the one of the blockchain nodes (step 812).

The various tasks performed in connection with processes 400-800 may be performed by software, hardware, firmware, or any combination thereof. For illustrative purposes, the preceding descriptions of processes 400-800 may refer to elements mentioned above in connection with FIGS. 1-3. In practice, portions of processes 400-800 may be performed by different elements of the described system, e.g., a process acceleration computer system, an assertor node computer system, an artificial intelligence (AI) modeling computer system, or any one of a network of blockchain nodes. It should be appreciated that processes 400-800 may include any number of additional or alternative tasks, the tasks shown in FIGS. 4-8 need not be performed in the illustrated order, and processes 400-800 may be incorporated into a more comprehensive procedure or process having additional functionality not described in detail herein. Moreover, one or more of the tasks shown in FIGS. 4-8 could be omitted from embodiments of the processes 400-800 as long as the intended overall functionality remains intact.

Figure 9:
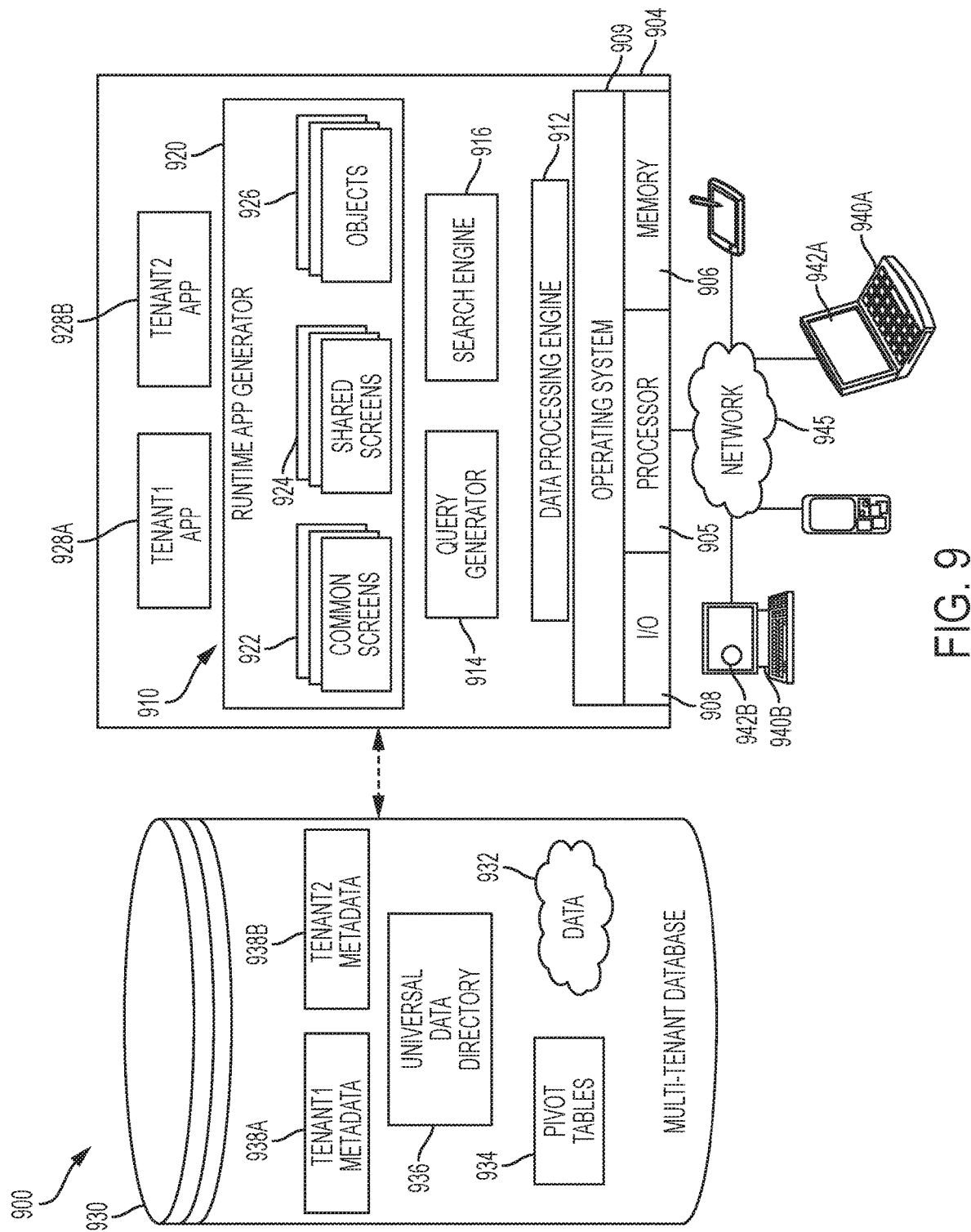
FIG. 9 is a conceptual block diagram of a multi-tenant system in accordance with one embodiment.

FIG. 9 is a conceptual block diagram of a multi-tenant system 900 in accordance with the disclosed embodiments. The multi-tenant system 900 may be used to in conjunction with the CRM software applications described previously. Platform as a Service (PaaS) is the foundation of the multi-tenant architecture. At the heart, this PaaS is a relational database management system. All of the core mechanisms in a relational database management system (RDBMS) (e.g., a system catalog, caching mechanisms, query optimizer, and application development features) are built to support multi-tenant applications and to be run directly on top of a specifically tuned host operating system and raw hardware. The runtime engine has the intelligence to access the metadata and transactional data and perform the application functionality that can scale.

The multi-tenant system 900 of FIG. 9 includes a server 902 that dynamically creates and supports virtual applications 928 based upon data 932 from a common database 930 that is shared between multiple tenants, alternatively referred to herein as a multi-tenant database. Data and services generated by the virtual applications 928 are provided via a network 945 to any number of client devices 940, as desired. Each virtual application 928 is suitably generated at run-time (or on-demand) using a common application platform 910 that securely provides access to the data 932 in the database 930 for each of the various tenants subscribing to the multi-tenant system 900. In accordance with one non-limiting example, the multi-tenant system 900 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 930. In this regard, each tenant includes one or more users associated with, assigned to, or otherwise belonging to that respective tenant. To put it another way, each respective user within the multi-tenant system 900 is associated with, assigned to, or otherwise belongs to a particular tenant of the plurality of tenants supported by the multi-tenant system 900. Tenants may represent customers, customer departments, business or legal organizations, and/or any other entities that maintain data for particular sets of users within the multi-tenant system 900 (i.e., in the multi-tenant database 930). For example, the application server 902 may be associated with one or more tenants supported by the multi-tenant system 900. Although multiple tenants may share access to the server 902 and the database 930, the particular data and services provided from the server 902 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 932 belonging to or otherwise associated with other tenants.

The multi-tenant database 930 is any sort of repository or other data storage system capable of storing and managing the data 932 associated with any number of tenants. The database 930 may be implemented using any type of conventional database server hardware. In various embodiments, the database 930 shares processing hardware 904 with the server 902. In other embodiments, the database 930 is implemented using separate physical and/or virtual database server hardware that communicates with the server 902 to perform the various functions described herein. In an exemplary embodiment, the database 930 includes a database management system or other equivalent software capable of determining an optimal query plan for retrieving and providing a particular subset of the data 932 to an instance of virtual application 928 in response to a query initiated or otherwise provided by a virtual application 928. The multi-tenant database 930 may alternatively be referred to herein as an on-demand database, in that the multi-tenant database 930 provides (or is available to provide) data at run-time to on-demand virtual applications 928 generated by the application platform 910.

In practice, the data 932 may be organized and formatted in any manner to support the application platform 910. In various embodiments, the data 932 is suitably organized into a relatively small number of large data tables to maintain a semi-amorphous "heap"-type format. The data 932 can then be organized as needed for a particular virtual application 928. In various embodiments, conventional data relationships are established using any number of pivot tables 934 that establish indexing, uniqueness, relationships between entities, and/or other aspects of conventional database organization as desired. Further data manipulation and report formatting is generally performed at run-time using a variety of metadata constructs. Metadata within a universal data directory (UDD) 936, for example, can be used to describe any number of forms, reports, workflows, user access privileges, business logic and other constructs that are common to multiple tenants. Tenant-specific formatting, functions and other constructs may be maintained as tenant-specific metadata 938 for each tenant, as desired. Rather than forcing the data 932 into an inflexible global structure that is common to all tenants and applications, the database 930 is organized to be relatively amorphous, with the pivot tables 934 and the metadata 938 providing additional structure on an as-needed basis. To that end, the application platform 910 suitably uses the pivot tables 934 and/or the metadata 938 to generate "virtual" components of the virtual applications 928 to logically obtain, process, and present the relatively amorphous data 932 from the database 930.

The server 902 is implemented using one or more actual and/or virtual computing systems that collectively provide the dynamic application platform 910 for generating the virtual applications 928. For example, the server 902 may be implemented using a cluster of actual and/or virtual servers operating in conjunction with each other, typically in association with conventional network communications, cluster management, load balancing and other features as appropriate. The server 902 operates with any sort of conventional processing hardware 904, such as a processor 905, memory 906, input/output features 908 and the like. The input/output features 908 generally represent the interface(s) to networks (e.g., to the network 945, or any other local area, wide area or other network), mass storage, display devices, data entry devices and/or the like. The processor 905 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 906 represents any non-transitory short or long term storage or other computer-readable media capable of storing programming instructions for execution on the processor 905, including any sort of random access memory (RAM), read only memory (ROM), flash memory, magnetic or optical mass storage, and/or the like. The computer-executable programming instructions, when read and executed by the server 902 and/or processor 905, cause the server 902 and/or processor 905 to create, generate, or otherwise facilitate the application platform 910 and/or virtual applications 928 and perform one or more additional tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or application platform, e.g., a portable hard drive, a USB flash drive, an optical disc, or the like.

The application platform 910 is any sort of software application or other data processing engine that generates the virtual applications 928 that provide data and/or services to the client devices 940. In a typical embodiment, the application platform 910 gains access to processing resources, communications interfaces and other features of the processing hardware 904 using any sort of conventional or proprietary operating system 909. The virtual applications 928 are typically generated at run-time in response to input received from the client devices 940. For the illustrated embodiment, the application platform 910 includes a bulk data processing engine 912, a query generator 914, a search engine 916 that provides text indexing and other search functionality, and a runtime application generator 920. Each of these features may be implemented as a separate process or other module, and many equivalent embodiments could include different and/or additional features, components or other modules as desired.

The runtime application generator 920 dynamically builds and executes the virtual applications 928 in response to specific requests received from the client devices 940. The virtual applications 928 are typically constructed in accordance with the tenant-specific metadata 938, which describes the particular tables, reports, interfaces and/or other features of the particular application 928. In various embodiments, each virtual application 928 generates dynamic web content that can be served to a browser or other client program 942 associated with its client device 940, as appropriate.

The runtime application generator 920 suitably interacts with the query generator 914 to efficiently obtain multi-tenant data 932 from the database 930 as needed in response to input queries initiated or otherwise provided by users of the client devices 940. In a typical embodiment, the query generator 914 considers the identity of the user requesting a particular function (along with the user's associated tenant), and then builds and executes queries to the database 930 using system-wide metadata 936, tenant specific metadata 938, pivot tables 934, and/or any other available resources. The query generator 914 in this example therefore maintains security of the common database 930 by ensuring that queries are consistent with access privileges granted to the user and/or tenant that initiated the request. In this manner, the query generator 914 suitably obtains requested subsets of data 932 accessible to a user and/or tenant from the database 930 as needed to populate the tables, reports or other features of the particular virtual application 928 for that user and/or tenant.

Still referring to FIG. 9, the data processing engine 912 performs bulk processing operations on the data 932 such as uploads or downloads, updates, online transaction processing, and/or the like. In many embodiments, less urgent bulk processing of the data 932 can be scheduled to occur as processing resources become available, thereby giving priority to more urgent data processing by the query generator 914, the search engine 916, the virtual applications 928, etc.

In exemplary embodiments, the application platform 910 is utilized to create and/or generate data-driven virtual applications 928 for the tenants that they support. Such virtual applications 928 may make use of interface features such as custom (or tenant-specific) screens 924, standard (or universal) screens 922 or the like. Any number of custom and/or standard objects 926 may also be available for integration into tenant-developed virtual applications 928. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 926 such as "account" objects, "opportunity" objects, "contact" objects, or the like. The data 932 associated with each virtual application 928 is provided to the database 930, as appropriate, and stored until it is requested or is otherwise needed, along with the metadata 938 that describes the particular features (e.g., reports, tables, functions, objects, fields, formulas, code, etc.) of that particular virtual application 928. For example, a virtual application 928 may include a number of objects 926 accessible to a tenant, wherein for each object 926 accessible to the tenant, information pertaining to its object type along with values for various fields associated with that respective object type are maintained as metadata 938 in the database 930. In this regard, the object type defines the structure (e.g., the formatting, functions and other constructs) of each respective object 926 and the various fields associated therewith.

Still referring to FIG. 9, the data and services provided by the server 902 can be retrieved using any sort of personal computer, mobile telephone, tablet or other network-enabled client device 940 on the network 945. In an exemplary embodiment, the client device 940 includes a display device, such as a monitor, screen, or another conventional electronic display capable of graphically presenting data and/or information retrieved from the multi-tenant database 930. Typically, the user operates a conventional browser application or other client program 942 executed by the client device 940 to contact the server 902 via the network 945 using a networking protocol, such as the hypertext transport protocol (HTTP) or the like. The user typically authenticates his or her identity to the server 902 to obtain a session identifier ("SessionID") that identifies the user in subsequent communications with the server 902. When the identified user requests access to a virtual application 928, the runtime application generator 920 suitably creates the application at run time based upon the metadata 938, as appropriate. As noted above, the virtual application 928 may contain Java, ActiveX, or other content that can be presented using conventional client software running on the client device 940; other embodiments may simply provide dynamic web or other content that can be presented and viewed by the user, as desired.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for using a distributed ledger (DL) of a blockchain applicable to a plurality of blockchain nodes, the method comprising:
    obtaining, at a first blockchain node of the plurality of blockchain nodes over a communication network, assertion data associated with an assertion placed on the blockchain by an assertor blockchain node of the plurality of blockchain nodes of a blockchain network, wherein the assertion corresponds to performance of an action by an entity and each blockchain node of the plurality of blockchain nodes comprises a computer system or computing device connected to the blockchain network;
    calculating, at the first blockchain node, an index value indicating a probability of a consensus for the assertion based at least in part on the assertion data and historical blockchain data stored at the first blockchain node, wherein the consensus comprises an agreement that the assertion is valid by at least a minimum number of blockchain nodes of the plurality of blockchain nodes and the historical blockchain data comprises at least one of historical consensus acceptance data and historical consensus timing data; and
    prior to the consensus:
        determining the index value is greater than a threshold associated with a consensus-triggered action item;
        computing a predicted time duration before the consensus is reached using the historical blockchain data; and
        initiating, by the first blockchain node, automatic execution of a computing process for the consensus-triggered action item corresponding to the assertion based at least in part on the index value and the predicted time duration to update data on a website or computer system associated with a second blockchain node of the plurality of blockchain nodes when the index value is greater than the threshold associated with the consensus-triggered action item.

2. The method of claim 1, further comprising:
    presenting the predicted time duration and the index value, by the first blockchain node.

3. The method of claim 1, further comprising:
    comparing the predicted time duration to a second threshold, by the first blockchain node; and
    when the predicted time duration is less than the second threshold, terminating the execution of the computing process for the consensus-triggered action item, by the first blockchain node.

4. The method of claim 1, further comprising monitoring the index value, by:
    updating the index value by performing one or more additional index value calculations using the historical blockchain data, during a second time period between the assertion and reaching the consensus, to generate one or more updated index values, by the first blockchain node;
    performing a comparison of each of the one or more updated index values to a predefined threshold, by the first blockchain node;
    storing the one or more updated index values and an indication of the comparison to the predefined threshold on the blockchain, by the first blockchain node; and
    presenting the one or more updated index values and the indication of the comparison to the predefined threshold, by the first blockchain node.

5. The method of claim 1, wherein initiating execution of the consensus-triggered action item further comprises:
  performing an automatic creation and transmission of a notification to the entity represented by the assertor blockchain node of the plurality of blockchain nodes;
  wherein the notification alerts the entity that consensus is likely to be reached and additional entity actions depending upon consensus are currently appropriate; and
  wherein the consensus-triggered action item comprises the automatic creation and transmission of the notification.

6. The method of claim 1, further comprising:
  performing pre-processing operations prior to placement of the assertion on the blockchain, by the first blockchain node, wherein the pre-processing operations comprise creating an artificial intelligence (AI) model and calculating the index value; and
  when the index value exceeds a predefined threshold, initiating placement of the assertion on the blockchain and initiating the execution of the consensus-triggered action item, by the first blockchain node.

7. The method of claim 1, further comprising:
  when the index value does not exceed a predefined threshold, transmitting a notification to the assertor blockchain node, by the first blockchain node.

8. The method of claim 1, further comprising:
  when consensus of the assertion is reached,
    identifying updated blockchain data comprising at least consensus assertion data, consensus assertor identity data, consensus acceptance data, consensus node data, and consensus timing data;
    updating an artificial intelligence (AI) model using the updated blockchain data, to create an updated AI model;
  using the updated AI model to compute a new index value for a second assertion by the assertor blockchain node; and
  when the new index value exceeds a predefined threshold, initiating the execution of the consensus-triggered action item.

9. A system communicatively coupled to a distributed ledger (DL) of a blockchain applicable to a plurality of blockchain nodes, the system comprising:
  a system memory element, configured to store at least an artificial intelligence (AI) model based on historical blockchain data stored on the blockchain;
  a communication device, configured to send and receive data transmissions;
  at least one processor, communicatively coupled to the system memory element and the communication device, the at least one processor configured to:
    obtain assertion data associated with an assertion placed on the blockchain by an assertor blockchain node of the plurality of blockchain nodes of a blockchain network, wherein the assertion corresponds to performance of an action by an entity and each blockchain node of the plurality of blockchain nodes comprises a computer system or computing device connected to the blockchain network;
    calculating an index value indicating a probability of a consensus for the assertion based at least in part on the assertion data and the historical blockchain data using the AI model, wherein the consensus comprises an agreement that the assertion is valid by at least a minimum number of blockchain nodes of the plurality of blockchain nodes and the historical blockchain data comprises at least one of historical consensus acceptance data and historical consensus timing data; and
    prior to the consensus:
      determining the index value is greater than a threshold associated with a consensus-triggered action item;
      computing a predicted time duration before the consensus is reached using the historical blockchain data; and
      initiating automatic execution of a computing process for the consensus- triggered action item corresponding to the assertion at a second blockchain node of the plurality of blockchain nodes based at least in part on the index value and the predicted time duration to update data on a website or computer system associated with the second blockchain node when the index value is greater than the threshold associated with the consensus-triggered action item.

10. The system of claim 9, wherein the at least one processor is further configured to:
  compute the predicted time duration before the consensus is reached, using the AI model and the historical blockchain data; and
  present the predicted time duration and the index value, via a display device communicatively coupled to the at least one processor.

11. The system of claim 9, wherein the at least one processor is further configured to determine suitability of placing the assertion on the blockchain, by:
  performing pre-processing operations prior to placement of the assertion on the blockchain, wherein the pre-processing operations comprise calculating the index value; and
  when the index value exceeds a predefined threshold, initiating placement of the assertion on the blockchain and initiating the execution of the consensus-triggered action item.

12. The system of claim 9, wherein the at least one processor is further configured to augment the AI model, by:
  when the consensus of the assertion is reached, identifying updated blockchain data comprising at least consensus assertion data, consensus assertor identity data, consensus acceptance data, consensus node data, and consensus timing data;
  updating the AI model using the updated blockchain data, to create an updated AI model;
  using the updated AI model to compute a new index value for a second assertion by the assertor blockchain node; and
  when the new index value exceeds the threshold, initiating the execution of the consensus-triggered action item.

13. The method of claim 1, further comprising obtaining, at the first blockchain node, third party data comprising non-blockchain data associated with the assertion from a third party source that is external to the blockchain, wherein calculating the index value comprises calculating the index value based at least in part on the assertion data, the historical blockchain data, and the third party data.

14. The method of claim 13, wherein the third party data comprises at least one of weather data, a wait time for a service and timeliness of a cooperative service performed by a different entity other than the assertor blockchain node.

15. The method of claim 13, wherein the consensus-triggered action item comprises updating at least one of order data, shipping status and location on the website associated with the second blockchain node.

16. A non-transitory machine-readable storage medium that provides instructions that, when executed by a processor, are configurable to cause said processor to perform operations comprising:
  obtaining assertion data associated with an assertion placed on a distributed ledger of a blockchain by an assertor blockchain node of a plurality of blockchain nodes of a blockchain network, wherein the assertion corresponds to performance of an action by an entity and each blockchain node of the plurality of blockchain nodes comprises a computer system or computing device connected to the blockchain network;
  calculating an index value indicating a probability of a consensus for the assertion based at least in part on assertion data and historical blockchain data, wherein the consensus comprises an agreement that the assertion is valid by at least a minimum number of blockchain nodes of the plurality of blockchain nodes and the historical blockchain data comprises at least one of historical consensus acceptance data and historical consensus timing data; and
  prior to the consensus:
    determining the index value is greater than a threshold associated with a consensus-triggered action item;
    computing a predicted time duration before the consensus is reached using the historical blockchain data; and
    initiating automatic execution of a computing process for the consensus-triggered action item corresponding to the assertion at a second blockchain node of the plurality of blockchain nodes based at least in part on the index value and the predicted time duration to update data on a website or computer system associated with the second blockchain node when the index value is greater than the threshold associated with the consensus-triggered action item.

17. The non-transitory machine-readable storage medium of claim 16, wherein the instructions are configurable to cause said processor to perform operations further comprising obtaining third party data comprising non-blockchain data associated with the assertion from a third party source that is external to the blockchain, wherein calculating the index value comprises calculating the index value based at least in part on the assertion data, the historical blockchain data, and the third party data.

18. The method of claim 1, wherein the consensus-triggered action item comprises an activity normally performed in response to reaching the consensus for the assertion.

19. The method of claim 1, wherein the consensus-triggered action item is one of a plurality of consensus-triggered action items corresponding to the assertion, wherein each consensus-triggered action item of the plurality of consensus-triggered action items requires a different threshold for the index value prior to initiating execution of the respective consensus-triggered action item.

20. The method of claim 1, wherein:
  the assertion comprises a record detailing a supply chain transaction; and
  the automatic execution of the computing process for the consensus-triggered action item corresponding to the assertion results in updated order status information provided via the website associated with the second blockchain node.

* * * * *